(12) United States Patent
van Rietschote et al.

(10) Patent No.: US 7,810,092 B1
(45) Date of Patent: Oct. 5, 2010

(54) CENTRAL ADMINISTRATION AND MAINTENANCE OF WORKSTATIONS USING VIRTUAL MACHINES, NETWORK FILESYSTEMS, AND REPLICATION

(75) Inventors: Hans F. van Rietschote, Sunnyvale, CA (US); Mahesh P Saptarshi, Milpitas, CA (US); Craig W. Hobbs, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1780 days.

(21) Appl. No.: 10/791,472

(22) Filed: Mar. 2, 2004

(51) Int. Cl.
G06F 9/455 (2006.01)
(52) U.S. Cl. .................... 718/1; 718/104; 709/217; 709/218; 709/219
(58) Field of Classification Search ................ 718/1, 718/104; 709/217, 218, 219
See application file for complete search history.

(56) References Cited

U.S. PATENT DOCUMENTS

| | | | |
|---|---|---|---|
| 4,912,628 A | 3/1990 | Briggs |
| 5,257,386 A | 10/1993 | Saito |
| 5,408,617 A | 4/1995 | Yoshida |
| 5,546,558 A | 8/1996 | Jacobson et al. |
| 5,621,912 A | 4/1997 | Borruso et al. |
| 5,809,285 A | 9/1998 | Hilland |
| 5,852,724 A | 12/1998 | Glenn, II et al. |
| 5,872,931 A | 2/1999 | Chivaluri |
| 5,944,782 A | 8/1999 | Noble et al. |
| 5,987,565 A | 11/1999 | Gavaskar |
| 6,003,065 A | 12/1999 | Yan et al. |
| 6,029,166 A | 2/2000 | Mutalik et al. |
| 6,075,938 A | 6/2000 | Bugnion et al. |
| 6,151,618 A | 11/2000 | Wahbe et al. |
| 6,230,246 B1 | 5/2001 | Lee et al. |
| 6,298,390 B1 | 10/2001 | Matena et al. |
| 6,298,428 B1 | 10/2001 | Munroe et al. |
| 6,324,627 B1 | 11/2001 | Krichelf et al. |
| 6,341,329 B1 | 1/2002 | LeCrone et al. |
| 6,363,462 B1 | 3/2002 | Bergsten |
| 6,370,646 B1 | 4/2002 | Goodman et al. |
| 6,397,242 B1 | 5/2002 | Devine et al. |

(Continued)

OTHER PUBLICATIONS

Jacob Gorm Hansen and Asger Kahl Henriksen, Nomadic Operating Systems, Dec. 10, 2002, 42 pages.

(Continued)

*Primary Examiner*—Andy Ho
(74) *Attorney, Agent, or Firm*—Lawrence J. Merkel; Meyertons, Hood, Kivlin, Kowert & Goetzel, P.C.

(57) ABSTRACT

In some embodiments, a system comprises at least one computer system, wherein the computer system is configured to execute a virtual machine corresponding to a user. The system further comprises a storage subsystem configured to store data representing the virtual machine and at least one file server. The file server is coupled to a network to which the computer system is configured to be coupled, and is also coupled to the storage subsystem. The file server is configured to provide the computer system with access to the data representing the virtual machine from the storage subsystem over the network. In some embodiments, the computer system is configured for essentially continuous connection to the network during use. In other embodiments, the computer system is configured for intermittent connection to the network during use.

38 Claims, 12 Drawing Sheets

U.S. PATENT DOCUMENTS

| | | | |
|---|---|---|---|
| 6,421,739 B1 | 7/2002 | Holida | |
| 6,421,777 B1 | 7/2002 | Pierre-Louis et al. | |
| 6,438,642 B1 | 8/2002 | Shaath | |
| 6,463,459 B1* | 10/2002 | Orr et al. | 709/203 |
| 6,493,811 B1 | 12/2002 | Blades et al. | |
| 6,496,847 B1 | 12/2002 | Bugnion et al. | |
| 6,694,346 B1 | 2/2004 | Aman et al. | |
| 6,704,925 B1 | 3/2004 | Bugnion | |
| 6,711,672 B1 | 3/2004 | Agesen | |
| 6,718,538 B1 | 4/2004 | Mathiske | |
| 6,725,289 B1 | 4/2004 | Waldspurger et al. | |
| 6,735,601 B1 | 5/2004 | Subrahmanyam | |
| 6,754,781 B2 | 6/2004 | Chauvel et al. | |
| 6,757,778 B1 | 6/2004 | van Rietschote | |
| 6,763,440 B1 | 7/2004 | Traversat et al. | |
| 6,763,445 B1 | 7/2004 | Klein et al. | |
| 6,772,231 B2 | 8/2004 | Reuter et al. | |
| 6,785,886 B1 | 8/2004 | Lim et al. | |
| 6,789,103 B1 | 9/2004 | Kim et al. | |
| 6,789,156 B1 | 9/2004 | Waldspurger | |
| 6,795,966 B1 | 9/2004 | Lim et al. | |
| 6,799,316 B1 | 9/2004 | Aguilar et al. | |
| 6,961,806 B1 | 11/2005 | Agesen et al. | |
| 6,961,941 B1 | 11/2005 | Nelson et al. | |
| 6,985,956 B2 | 1/2006 | Luke et al. | |
| 7,069,413 B1 | 6/2006 | Agesen et al. | |
| 7,082,598 B1 | 7/2006 | Le et al. | |
| 7,089,377 B1 | 8/2006 | Chen | |
| 7,111,060 B2* | 9/2006 | Araujo et al. | 709/224 |
| 7,111,086 B1 | 9/2006 | Ecoleston et al. | |
| 7,111,145 B1 | 9/2006 | Chen et al. | |
| 7,111,481 B2 | 9/2006 | Green et al. | |
| 7,203,944 B1 | 4/2007 | van Rietschote et al. | |
| 7,213,246 B1 | 5/2007 | van Rietchote et al. | |
| 7,246,200 B1 | 7/2007 | van Rietschote et al. | |
| 7,266,637 B1 | 9/2007 | van Rietschote | |
| 7,360,237 B2* | 4/2008 | Engle et al. | 726/1 |
| 7,533,229 B1 | 5/2009 | van Rietschote | |
| 7,603,670 B1 | 10/2009 | van Rietschote | |
| 2001/0016879 A1 | 8/2001 | Seklguchi et al. | |
| 2002/0049869 A1 | 4/2002 | Ohmura et al. | |
| 2002/0069369 A1 | 6/2002 | Tremain | |
| 2002/0099753 A1 | 7/2002 | Hardin et al. | |
| 2002/0129078 A1 | 9/2002 | Plaxton et al. | |
| 2003/0028861 A1 | 2/2003 | Wallman et al. | |
| 2003/0033431 A1 | 2/2003 | Shinomiya | |
| 2003/0097422 A1 | 5/2003 | Richards et al. | |
| 2003/0110351 A1 | 6/2003 | Blood et al. | |
| 2003/0126242 A1 | 7/2003 | Chang | |
| 2004/0010787 A1 | 1/2004 | Traut et al. | |
| 2004/0268340 A1 | 12/2004 | Steeb et al. | |
| 2005/0086492 A1* | 4/2005 | Nicodemus et al. | 713/182 |
| 2005/0114520 A1* | 5/2005 | White et al. | 709/228 |

OTHER PUBLICATIONS

Kinshuk Govil, "Virtual Clusters" Resource Management on Large Shared-Memory Multiprocessors, Oct. 2000, 133 pages.
Constantine P. Sapuntzakis, et al., "Optimizing the Migration of Virtual Computer," Feb. 12, 2003, 26 pages.
Edouard Bugnion, et al., "Running Commodity Operating Systems on Scalable Multiprocessors," 1997, 13 pages.
Veritas, "Executive Overview," Technical Overview, pp. 1-9.
Kinshuk Govil, et al., "Cellular Disco: Resource Management Using Virtual Clusters on Shared-Memory Multiprocessors," 17th ACM Symposium on Operating Systems Principles (SOSP'99), Published as Operating Systems Review 34(5):154-169, Dec. 1999, pp. 154-169.
Edouard Bugnion, et al., "Disco: Running Commodity Operating Systems on Scalable Multiprocessors," Computer Systems Laboratoy, Stanford, CA, 33 pages.
"White Paper, GSX Server," VMware, Inc., Dec. 2000, pp. 1-9.
"Vmware GSX Serve, The Server Consolidation Solution,"VMware, Inc., 2001, 2 pages.
"Manage Multiple Worlds., From Any Desktop," VMware, Inc., 2000, 2 pages.
"VMware ESX Server, The Server Consolidaton Solution for High-Performance Environments," VMware, Inc., 2001, 2 pages.
Melinda Varian, "VM and the VM Community: Past, Present, and Future," Operating Systems, Computing and Information Technology, Princeton Univ., Aug. 1997, pp. 1-67.
VERITAS, "Comparison: Microsoft Logical Disk Manager and VERITAS Volume Manager for Windows," May 2001, 4 pages.
VERITAS, "How VERITAS Volume Manager Complements Hardware RAID in Microsoft Server Environments," May 2001, pp. 1-7.
VERITAS, "VERITAS Volume Manager for Windows, Best Practices," May 2001, pp. 1-7.
Barrie Sosinky, Ph.D., "The Business Value of Virtual Volume Management, In Microsoft Window NT and Windows 2000 Netowrks," VERITAS, A white paper for administrators and planners, Oct. 2001, pp. 1-12.
"BladeFram™ System Overview," Egenera, Inc., 2001 2 pages.
White Paper, "The Egenera™ Processing Area Network (PAN) Architecture," Egenera, Inc., 2002, 20 pages.
White Paper, "Emerging Server Architectures," Egenera, Inc., 2001, 12 pages.
White Paper, "Improving Data Center Performance," Egenera, Inc., 2001, 19 pages.
White Paper, "Guidelines for Effective E-Business Infrastructure Management," Egenera, Inc., 2001, 11 pages.
White Paper, "The Pros and Cons of Server Clustering in the ASP Environment," Egenera, Inc., 2001, 10 pages.
Position Paper, "Taking Control of The Data Center," Egenera, Inc., 2001, 4 pages.
Position Paper, "The Linux Operating System: How Open Source Software Makes Better Hardware," Egenera, Inc., 2001, 2 pages.
"Solution Overview," TrueSAN Networks, Inc., 2002, 7 pages.
"Simics: A Full System Simulation Platform," Reprinted with permission from Computer, Feb. 2002, © The Institute of Electrical and Electronics Engineering, Inc., pp. 50-58.
"Introduction to Simics Full-System Simulator without Equal," Virtutech, Jul. 8, 2002, 29 pages.
"The Technology of Virtual Machines," A Conneectix White Paper, Connectix Corp., 2001, 13 pages.
"The Technology of Virtual PC," A Conneectix White Paper, Connectix Corp., 2000, 12 pages.
"About LindowsOS," Lindows.com, 2002, 2 pages.
"Savannah: This is a Savannah Admin Documentation," Savannah, Free Software Foundation, Inc. © 2000-2002, 31 pages.
"Virtuozzo Basics," Virtuozzo, © 1994-2002 SWsoft, printed from web on Dec. 13, 2002, 2 pages.
"What is Virtual Environmnet(VE)?," SWsoft, © 1994-2002 SWsoft, printed from web on Dec. 13, 2002, 2 pages.
"Products," Netraverse, Inc, 2002, printed from web on Dec. 13, 2002, 1 page.
"NeTraverse Win4Lin 4.0—Workstation Edition," Netraverse, Inc, 2002, printed from web on Dec. 13, 2002, 1 page.
"Win4Lin Desktop 4.0," Netraverse, Inc, 2002, printed from web on Dec. 13, 2002, 1 page.
"Win4Lin Desktop 4.0," Netraverse, Inc, 2002, printed from web on Dec. 13, 2002, 2 page.
"Win4Lin Terminal Server 2.0," Netraverse, Inc, 2002, printed from web on Dec. 13, 2002, 1 page.
Win4Lin Terminal Server 2.0, Netraverse, Inc, 2002, printed from web on Dec. 13, 2002, 2 pages.
Win4Lin, Netraverse, Inc, 2002, printed from web on Dec. 13, 2002, 5 pages.
"Virtual PC for Windows," Connectix, Version 5.0, 2002, 2 pages.
Dave Gardner, et al., "WINE FAQ,", © David Gardner 1995-1998, printed from 13 pages.
"Winelib User's Guide," Winelib, 26 pages.
John R. Sheets, et al. "Wine User Guide,", pp. 1-53.
"Wine Developer's Guide," pp. 1-104.

VERITAS, "VERITAS Volume Manager for Windows NT," Version 27, 2001, 4 pages.

Sapuntzakis, et al., "Optimizing the Migration of Virtual Computers," Proceedings of the Fifth Symposium on Operating Systems Design and Implementation, Dec. 2002, 14 pages.

Helfrich, et al., "Internet Suspend/Resume," ISR Project Home Page, 2003, 4 pages.

Kozuch, et al., "Internet Suspend/Resume," IRP-TR-02-01, Apr. 2002, Accepted to the Fourth IEEE Workshop on Mobile Computing Systems and Applications, Callicoon, NY, Jun. 2002, Intel Research, 9 pages.

Kozuch, et al., "Efficient State Transfer for Internet Suspend/Resume," IRP-TR-02-03, May 2002, Intel Research, 13 pages.

Tolia, et al., "Using Content Addressing to Transfer Virtual Machine State," IRP-TR-02-11, Summer 2002, Intel Research, 11 pages.

Flinn, et al., "Data Staging on Untrusted Surrogates," IRP-TR-03-03, Mar. 2003, Intel Research, To Appear in the Proceedings of the $2^{nd}$ USENIX Conference on File and Storage Technologies, San Francisco, 16 pages.

Tolia, et al., "Opportunistic Use of Content Addressable Storage for Distributed File Systems," IRP-TR-03-02, Jun. 2003, Intel Research, To Appear in the Proceedings of the 2003 USENIX Annual Technical Conference, San Antonio, TX, 16 pages.

VMware, Inc., "VMware Control Center," 2003, 3 pages.

InfoWorld, Robert McMillan, "VMware Launches VMware Control Center," 2003, 2 pp.

VMware, Inc., "VMware Control Center: Enterprise-class Software to Manage and Control Your Virtual Machines," 2003, 2 pages.

John Abbott, Enterprise Software, "VMware Heads Toward Utility Computing With New Dynamic Management Tools," Jul. 1, 2003, 4 pages.

Dejan S. Milogicic, et al., "Process Migration," Aug. 10, 1999, 49 pages.

Xian-He Sun, et al., "A Coordinated Approach for Process Migration in Heterogeneous Environments," 1999, 12 pages.

Kasidit Chanchio, et al., "Data Collection and Restoration for Heterogeneous Process Migration," 1997, 6 pages.

Kasidit Chanchio, et al., "A Protocol Design of Communication State Transfer for Distributed Computing," Publication date unknown, 4 pages.

SourceForge™, "Project: openMosix: Document Manager: Display Document," 14 pages.

OpenMosix, "The openMosix HOWTO: Live free() or die ()," May 7, 2003, 3 pages.

OpenMosix, "openMosix Documentation Wiki—don't," May 7, 2003, 2 pages.

Dave Stewart, "Problems", Nov. 18, 1998, 3 pages, printed from.

VERITAS, "VERITAS Storage Replicator, Real-time Replication for Business Critical Windows NT and Windows 2000 Environments," 7 pages.

VERITAS, "VERITAS Volume Replicator™ White Paper, A Guide to Understanding VERITAS Volume Replicator," White Paper, 2002, 15 pages.

* cited by examiner

| Local Volume State | Remote Volume State | Action |
| --- | --- | --- |
| Primary Connected | Secondary of Client System | Continue Replication |
| Primary Connected | Not Secondary of Client System | Error 1 |
| Primary Disconnected | Idle | Remote = Secondary, Local = Primary, Replicate |
| Primary Disconnected | Not Idle | Error 2 |
| Secondary | Primary of Client System | Continue Replication |
| Secondary | Not Primary of Client System | Error 3 |
| Idle | Idle | Continue |

Fig. 11

CENTRAL ADMINISTRATION AND MAINTENANCE OF WORKSTATIONS USING VIRTUAL MACHINES, NETWORK FILESYSTEMS, AND REPLICATION

BACKGROUND OF THE INVENTION

1. Field of the Invention

This invention is related to the field of administering and maintaining computer systems on a network or sometimes connected to a network.

2. Description of the Related Art

An important figure for computer systems is the total cost of ownership (TCO). The TCO includes the costs in acquiring the computer system and related software, and also includes a variety of ongoing costs for maintaining the computer system in working order. Exemplary TCO costs may include costs for: installing the operating system (OS) and the applications needed by the user of the computer system; configuring the applications to meet the user's needs; updating and upgrading the OS and applications as service packs or upgrades are released; virus scanning and virus removal; backing up user data and software configuration data; and problem solving (both hardware and software). Problems may be caused by actions of the user, the software, or the computer system hardware. In most organizations, one or more administrators has the task of acquiring, installing, and maintaining the computer systems used by the organization.

While installing the OS and application software may be performed on the computer system prior to delivering the computer system to the user, other maintenance activities typically must be performed with the computer system at the user's location. In some cases, remote access may be used by the administrator to access the user's computer system remotely, so that the administrator need not physically travel to the user's location to operate on the computer system. However, some problems cannot be diagnosed remotely, particularly if the problem with the user's computer system is preventing the computer system from operating well enough to communicate on a network. When remote access is not possible, the administrator either travels to the user's location or temporarily moves the user's computer system to the administrator's location to correct the problem. Costs associated with the traveling of the administrator and/or relocating the computer system may further increase TCO, particularly for larger organizations or geographically dispersed organizations.

One solution that has been used in the past is the "terminal server" solution. In this solution, the user's computer system is merely a "thin client" that includes software to connect to a central terminal server and to display an interface for the user. The user's applications are executed on the central terminal server, which is shared among many users. The central terminal server must be a relatively high powered (and thus expensive) computer system, to provide acceptable processing power when all of the users are connected. Additionally, the central terminal server requires a fairly large amount of storage for user data. The terminal server solution centralizes most of the function in the organization, presumably near the administrators. However, the processing power of the user's computer system is frequently wasted, since the local processor in each computer system is only used for display and communication with the central terminal server. Additionally, each terminal server can handle a maximum user load, and thus multiple terminal servers may be required. Furthermore, the terminal server solution is highly exposed to failures of the central terminal servers: when a given central terminal server fails, each user connected to the central terminal server experiences the failure, and is down until the central terminal server can be brought back up.

In some cases, a network filesystem such as the Network Filesystem (NFS) is used and all applications on the user's computer system are configured to store configuration files and user data on networked storage. While centralization of user data is provided this way (permitting, e.g., centralized backup of user data), many operating system configuration files cannot be stored in this fashion. For example, the Microsoft Windows™ operating system's registry is stored locally on the user's computer system. Accordingly, maintenance of the user's computer system still often involves accessing the user's computer system or relocation of the computer system. Furthermore, users may choose to store some data locally on their computer systems, and such data is not backed up.

Portable computers, such as laptops, present additional challenges. Portable computers are often used away from the user's location, and thus the terminal server solution is not appropriate for the portable computer. Additionally, since the user physically carries the portable computer from location to location, the portable computer may be subject to physical loss or damage in addition to the typical problems experienced by fixed-location computer systems. While most data files may be backed-up from a portable computer system (either by the user or automatically, when it is connected to a network), many application configuration "tweaks" and other modifications may not be backed-up and thus may be lost when the portable computer system is lost or damaged.

SUMMARY OF THE INVENTION

In some embodiments, a system comprises at least one computer system, wherein the computer system is configured to execute a virtual machine corresponding to a user. The system further comprises a storage subsystem configured to store data representing the virtual machine and at least one file server. The file server is coupled to a network to which the computer system is configured to be coupled, and is also coupled to the storage subsystem. The file server is configured to provide the computer system with access to the data representing the virtual machine from the storage subsystem over the network.

In other embodiments, a computer accessible medium comprises a plurality of instructions which, when executed on a computer system responsive to a login of a user on the computer system, cause the computer system to execute a virtual machine corresponding to the user. The virtual machine is represented by data stored in a filesystem accessible to the computer system, at least intermittently. In still other embodiments, a computer system comprising the computer accessible medium and execution hardware configured to execute the plurality of instructions is contemplated.

In some embodiments, a method is contemplated. Responsive to a login of a user on a computer system, a virtual machine is executed on the computer system. The virtual machine corresponds to the user. A filesystem is managed on a storage subsystem using at least one file server, wherein the storage subsystem stores data representing the virtual machine. At least intermittently, communication between the file server and the computer system over a network is performed to provide access to the data representing the virtual machine.

Another method is also contemplated in some embodiments. The method may be used, e.g., in a system comprising at least one computer system on which a user logs in during use, at least one file server coupled to a network to which the computer system is coupled at least intermittently, a storage subsystem storing data representing a virtual machine corresponding to a user, and a second computer system used by an administrator, wherein the file server manages a filesystem on the storage system and provides access to the data representing the virtual machine to the computer system. The method may comprise executing the virtual machine on the second computer system responsive to the user reporting a problem with the virtual machine; diagnosing the problem; and, if the problem is within the virtual machine, correcting the problem by modifying the data representing the virtual machine on the storage subsystem.

BRIEF DESCRIPTION OF THE DRAWINGS

The following detailed description makes reference to the accompanying drawings, which are now briefly described.

FIG. 11 is a table of volume states on the client and the file server for one embodiment of the flowchart shown in FIG. 9.

Figure 1:
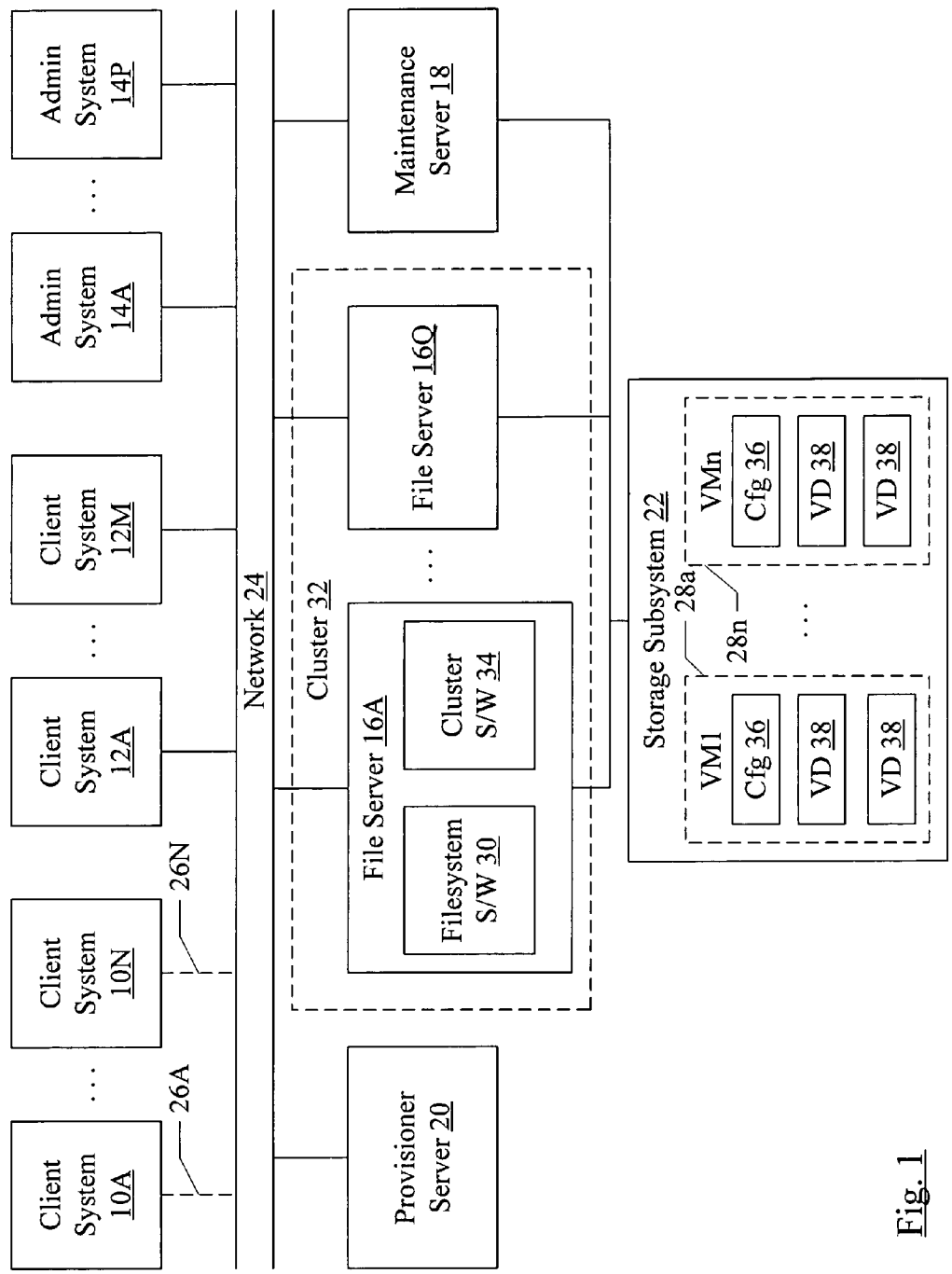
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system comprising a plurality of computer systems assigned various roles is shown. Particularly, a first set of client computer systems 10A-10N and a second set of client computer systems 12A-12M are shown. The client computer systems 10A-10N and 12A-12M (more briefly, "client systems") are computer systems assigned to users for their use. Additionally, a set of administrator computer systems (admin systems) 14A-14P are shown in FIG. 1. The admin systems 14A-14P are assigned to administrators for their use. A set of file servers 16A-16Q, a maintenance server 18, and a provisioner server 20 are also shown in FIG. 1. A storage subsystem 22 is also shown. The client systems 10A-10N and 12A-12M, the admin systems 14A-14P, the file servers 16A-16Q, the maintenance server 18 and the provisioner server 20 are connected (or at least capable of being connected) to a network 24. The file servers 16A-16Q and the maintenance server 18 are coupled to the storage subsystem 22.

In the system of FIG. 1, each user may have at least one corresponding virtual machine dedicated to that user. In some embodiments, there may be a one-to-one correspondence between users and virtual machines. That is, when the user logs in to a client system 10A-10N or 12A-12M, the virtual machine that corresponds to that user may be started. In other embodiments, a given user may have more than one virtual machine. The user may log in to a client system 10A-10N or 12A-12M and select a virtual machine to be started. The user's virtual machine may comprise the machine state associated with that user, which may include the user's OS, application software, application and OS configuration data, and user data. Data representing each user's virtual machine may be stored on the storage subsystem 22. For example, in FIG. 1, the storage subsystem 22 may store data representing a set of virtual machines including VM1-VMn (reference numerals 28a-28n). The client systems 10A-10N and 12A-12M may be configured to execute virtual machines in response to the corresponding user's log in to a client system 10A-10N or 12A-12M.

The file servers 16A-16Q are computer systems that are configured to manage a filesystem on the storage system 22, and thus to provide user access to the virtual machine data on the storage subsystem 22. At least one file server 16A-16Q may be provided. Each file server 16A-16Q may include filesystem software (e.g. filesystem software 30 on the file server 16A) configured to manage the filesystem. In the illustrated embodiment, a plurality of file servers 16A-16Q are provided in a cluster 32 to provide high availability of the filesystem in the face of potential failures of file servers. That is, if a file server 16A-16Q fails, the client systems 10A-10N and 12A-12M that were using the failing file server 16A-16Q to access virtual machine data on the storage subsystem 22 may "fail over" to another file server 16A-16Q to continue access to the virtual machine data. In clustered embodiments, the file servers 16A-16Q may include cluster software (e.g. cluster software 34 in the file server 16A).

As mentioned above, the virtual machine data (sometimes referred to as the virtual machine image) contains the machine state associated with the user. For example, in the illustrated embodiment, the virtual machine data for each virtual machine may include a configuration file (reference numeral 36) and one or more virtual disk files (reference numeral 38). The configuration file may store configuration information for the virtual machine, which may include the number of virtual disks, the size of the virtual disks, and any other information. The virtual disk files 38 may include the data stored on the virtual disks in the user's virtual machine. Thus, the virtual disk files 38 may include some or all of the user's software (OS and applications), application and OS configuration files, etc. Additionally, the virtual disk files include some or all of the user's data. Each virtual disk may appear, to the user, as a storage device within the user's virtual machine. While a configuration file 36 and a virtual disk file 38 for each virtual disk are included in the virtual machine data in the present embodiment, any organization of the virtual machine data may be used in other embodiments.

Since the virtual machine state is stored on the storage subsystem 22, maintenance of the users' virtual machines may be performed on the virtual machine data on the storage subsystem 22. For example, the maintenance server 18 may be included to periodically perform various maintenance actions. As used herein, a "maintenance action" may comprise any activities which may be performed periodically on each user's machine (virtual machine, in this case) to help ensure the correct operation of the machines and/or the recovery of user state in the event of a failure. For example, maintenance actions may include, in some embodiments, one or more of: backup, virus scan and virus removal, scan for corruption of data in the virtual disks (e.g. corrupt sectors, blocks, etc.), application of software updates/upgrades, etc. Performing the maintenance actions on the virtual machine data in the storage subsystem 22 may eliminate having to contact/connect to each client system 10A-10N and 12A-12M to perform the maintenance actions.

Problem diagnosis in the system of FIG. 1 may be performed by executing the virtual machine that exhibits the problem on an administrator's system 14A-14P. Once the problem is located and corrected, the administrator may stop the virtual machine and the user may restart the corrected virtual machine from the storage subsystem 22. Traveling by the administrator to the user's location and/or relocating the user's computer system to the administrator's location may by eliminated, in some embodiments.

Since the client systems 10A-10N and 12A-12M execute the user's virtual machines, including executing the user's software (OS and applications) within the user's virtual machine, the processing power of the client systems 10A-10N and 12A-12M may be more fully utilized, in some embodiments. The file servers 16A-16Q provide file service to the client systems 10A-10N and 12A-12M, but the execution of applications/user OS is on the client systems 10A-10N and 12A-12M. Thus, the file servers 16A-16Q need only be provided with enough processing power to provide the file service, in some embodiments. Additionally, each user's virtual machine is independent of other virtual machines. If a given user's virtual machine is corrupted or otherwise cannot be executed, other users may not be impacted.

The client systems 12A-12M may be configured for essentially continuous connection to the network 24 during use. That is, once the client systems 12A-12M are booted and operating, the client systems 12A-12M are configured to maintain a connection to the network 24. The network 24 may be unavailable at times, but in general the client systems 12A-12M may have a network connection while in operation. The client systems 12A-12M may be referred to more succinctly as "always-connected" systems.

A client system 12A-12M may access the virtual machine data for a given user on the storage subsystem 22 responsive to that user logging in to the client system 12A-12M. Updates to the user's virtual machine (e.g. write operations to the user's virtual disks) may be written to the virtual machine data on the storage system 22. Reads of virtual machine data may be reads from the storage subsystem 22. In some embodiments, the client system 12A-12M may cache virtual machine data to offload the file servers 16A-16Q. Since the client systems 12A-12M access a given virtual machine responsive to a log in by the corresponding user, any user may log in to any client system 12A-12M and may have access to the user's virtual machine on the client system 12A-12M.

The client systems 10A-10N may be intermittently connected to the network 24 (illustrated by the dotted lines 26A-26N in FIG. 1). For example, the client systems 10A-10N may include portable computer systems such as laptops that are sometimes operated without a network connection, as well as computer systems that are not portable but which have an intermittent network connection (e.g. a dialup modem connection). The client system 10A-10N may still execute a user's virtual machine. However, rather than relying on access to the storage subsystem 22, the client systems 10A-10N may be configured to replicate virtual machine data. For example, file replication or volume replication may be used. A copy of the user's virtual machine may be made to the client system 10A-10N, and the virtual machine may be executed from the local copy on the client system 10A-10N. Modifications to the virtual machine data may be replicated by the client system 10A-10N to the virtual machine data on the storage subsystem 22 when a network connection is available. Similarly, if a maintenance action is performed on the virtual machine on the storage subsystem 22 or a problem is corrected by an administrator and the corrected virtual machine is on the storage subsystem 22, replication from the storage subsystem 22 to the client system 10A-10N may be performed to provide the updated/corrected virtual machine to the client system 10A-10N.

In addition to using replication for intermittently-connected client systems, replication may also be used for client systems 10A-10N that may have an essentially continuous network connection that is not "fast enough" (e.g. not high enough bandwidth or with a latency that is too high) to permit acceptable performance if the virtual machine is operated in the manner described above for the client systems 12A-12M. Since the replication may occur in the background, user operation of the virtual machine may not be slowed by the network connection speed even though the user's updates to the virtual machine data are being replicated. In some embodiments, all client systems may use replication rather than executing the virtual machine from the storage subsystem 22. User log in to any client system may still be supported. When the user logs in to a different client system than the client system that the user logged in to the previous time, a replication of the user's virtual machine data to the new client system may occur.

In some embodiments, the provisioner server 20 may be provided. The provisioner server 20 may be configured to provision client systems 10A-10N and 12A-12N with the resources to execute virtual machines. More particularly, if an administrator corrects a problem in a user's virtual machine, the administrator may also choose to reprovision the client system that was executing the user's virtual machine (e.g. if the problem indicates that the software or configuration of the client system may contribute to the problem). Additionally, in some cases, the client system hardware may be replaced (e.g. due to a problem identified by a user, to retire old hardware, etc.). The new client system may be provisioned on its initial boot by the provisioner server 20. The provisioner server 20 may include provisioner software that is designed to provision computer systems with resources (which may include one or more of OS software, application software, and/or various configuration information such as Internet Protocol (IP) address, etc.). Any provisioner software may be used in various embodiments. For example, the OpForce™ products provided by VERITAS™ Software Corporation (Mountain View, Calif.) may be used. Other examples may include provisioning products from Altiris, Inc. (Lindon, Utah), netboot, provisioning products from Opsware, Inc. (Sunnyvale, Calif.), PowerCockPit from Mountain View Data, Inc. (Mountain View, Calif.), and Automated Deployment Services from Microsoft Corp. (Redmond, Wash.), etc. In some embodiments, the provisioner server 20 may be coupled to the storage subsystem 22 as well. For example, the provisioner server 20 may store resource images to be installed on various client systems on the storage subsystem 22.

The storage subsystem 22 may comprise any number and type of storage device. For example, the storage subsystem 22 may comprise storage devices in a storage area network (SAN) configuration, and the storage subsystem 22 may include SAN switches and other devices for providing connectivity to the SAN storage devices. Other embodiments may comprise network attached storage (NAS) and/or storage devices coupled to a peripheral interface such as small computer systems interface (SCSI), Fibre channel, integrated drive electronics (IDE) interface, other storage controllers, etc. Any combination of storage devices coupled in any desired fashion may be used.

The file servers 16A-16Q may comprise computer systems configured to provide file service for the storage subsystem 22. Any filesystem capable of service over a network may be used. In one particular implementation, for example, NFS may be used. NFS may be stateless on the file server (that is, no file state may be maintained on the NFS servers). Thus, fail over from one NFS server to another may, in some cases, be relatively straightforward and relatively rapid, since no file state needs to be recovered from the failing NFS server. In other implementations, other filesystems may be used (e.g. Andrew filesystem (AFS), common Internet filesystem (CIFS), etc.). The filesystem software 30 on the file server 16A (and similar software on other file servers) may implement the filesystem.

In one embodiment, each user may have a directory in the filesystem on the storage subsystem 22, in which the virtual machine data representing the user's virtual machine is stored. The user's directory may be mounted by the client system that the user logs in to. In the case of client systems 10A-10N, the user's directory may be mounted if the client system 10A-10N is connected to the network 24.

As mentioned above, in some embodiments, the file servers 16A-16Q may be clustered for high availability. A cluster may comprise two or more computer systems that permit fail over from one computer system to another in a fashion that is essentially transparent to client systems coupled to the cluster. For example, a given file server 16A-16Q may provide file service to a given client system 10A-10N or 12A-12M. If the given file server 16A-16Q experiences a failure, the file service for the given client system may be failed over to another file server 16A-16Q without the given client system having to reconnect to the file server. While filesystem performance may be temporarily affected, the given client system may otherwise be unaware of the fail over and may continue to receive file service from the failed-to file server. In embodiments that implement a cluster, the cluster software 34 may be included on each file server 16A-16Q. Any cluster software may be used. For example, VERITAS Cluster Server™ (VCS) available from VERITAS Software Corporation may be used in some embodiments.

Generally, a virtual machine may comprise any combination of software, one or more data structures in memory, and/or one or more files on one or more storage devices. The virtual machine represents the software and hardware used by a user to which the virtual machine is assigned. For example, the virtual machine may include the user's data, applications, and OS software. The configuration file of the virtual machine may specify a virtual CPU, the virtual disks, and other virtual input/output devices (e.g. virtual network interface cards), the amount of memory allocated to the virtual machine, etc.

Different virtual machines which execute on the same computer system may differ. For example, the OS included in each virtual machine may differ. Different virtual machines may employ different versions of the same OS (e.g. Microsoft Windows NT with different service packs installed), different versions of the same OS family (e.g. Microsoft Windows NT and Microsoft Windows 2000), or different OSs (e.g. Microsoft Windows NT, Linux, Sun Solaris, other Unix flavors, etc.). Furthermore, the OS in each virtual machine may differ from the OS installed on the client computer systems.

The network 24 may comprise any network technology in various embodiments. The network 24 may be a local area network, metropolitan area network, wide area network, intranet network, Internet network, wireless network, or any other type of network or combinations of the above networks. Any network media may be used. For example, the network 24 may comprise an Ethernet network. Alternatively, the network may comprise a token ring network, etc.

In various embodiments, the number of each type of computer system shown in FIG. 1 may vary. That is, any number of client systems 10A-10N may be included; any number of client systems 12A-12M may be included; any number of admin systems 14A-14P may be included; any number of provisioner servers 20 may be included; any number of file servers 16A-16Q may be included; and any number of maintenance servers 18 may be included.

Figure 2:
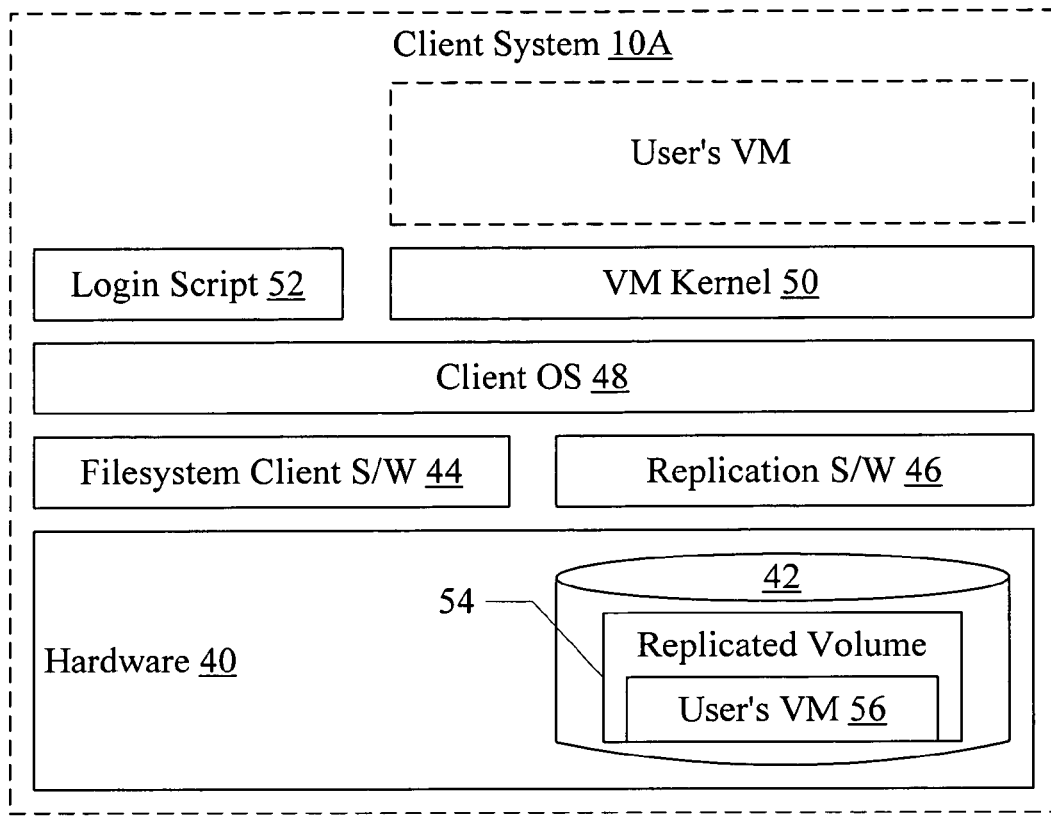
FIG. 2 is a block diagram of one embodiment of a client system that may be intermittently coupled to a network in the system of FIG. 1.

Turning now to FIG. 2, a block diagram of one embodiment of the client system 10A is shown. Any intermittently-connected client system or slow-connected client system may be similar. In the illustrated embodiment, the client system 10A includes hardware 40 (which further includes a storage device 42), filesystem client software 44, replication software 46, a client OS 48, a virtual machine (VM) kernel 50, and a login script 52. The storage device 42 includes a replicated volume 54, on which the data representing the user's VM 56 is stored. In other embodiments, the replicated volume 54 is optional (e.g. if file replication is used).

The hardware 40 generally comprises the hardware included in the client system 10A. The hardware 40 may comprise one or more processors configured to execute the instructions comprising the software on the client system 10A, memory for use by the software on the client system 10A, and peripheral devices (e.g. storage devices such as device 42, network connection hardware, user interface devices, etc.).

The filesystem client software 44 may comprise software for interacting with the filesystem software on the file servers 16A-16Q. In some embodiments, the filesystem client software 44 may comprise a driver for the client OS 48.

The replication software 46 comprises the software used to replicate the virtual machine data representing the user's virtual machine to/from the storage subsystem 22. In the illustrated embodiment, the replication software 46 may perform volume replication. A volume on the storage device 42 (or on multiple storage devices 42) may be defined and may be identified to the replication software 46 as a volume to be replicated to the storage subsystem 22. The files representing the user's VM 56 may be stored in the replicated volume. The replication software 46 may be configured to log updates to the volume and to replicate the updates to the storage subsystem 22 when a network connection is available. Thus, the files representing the user's VM 56 may be replicated to the storage subsystem 22. Any volume replication software may be used. For example, in some embodiments, the VERITAS Volume Replicator™ available from VERITAS Software Corporation may be used. Other examples may include Symmetrix Remote Data Facility from EMC Corporation. In other embodiments, file replication software may be used. File replication software replicates on a file basis. That is, when a file is updated, the change to the file is replicated. In some implementations, the entire file may be replicated. In other embodiments, only the change to the file may be replicated. Any file replication technology may be used (e.g. incremental, bulk, etc.). The files representing the user's VM 56 may be identified to the file replication software to be replicated to the storage subsystem 22. Any file replication software may be used. For example, VERITAS Storage Replicator™ available from VERITAS Software Corporation may be used. In other embodiments, other file replication software may be used (e.g. DoubleTake from NSI Software). Other embodiments may use the EMC Replication Manager from EMC Corporation.

It is noted that, while FIG. 2 illustrates the user's virtual machine data as residing in a replicated volume, multiple replicated volumes may be used to store different portions of the user's virtual machine data in some embodiments. For example, in some embodiments, one or more virtual disks may be stored on different replicated volumes.

The client OS 48 is the OS executed by the client system 10A. Any OS may be used (e.g. any version of Microsoft Windows, Sun Solaris, Linux, other Unix varieties, etc.). Particularly, the client OS 48 may differ from the user's OS included in the user's virtual machine.

The VM kernel 50 may comprise the software that schedules virtual machines for execution on the underlying hardware 40 and handles traps from the virtual machines (e.g. when virtual hardware is accessed, instruction execution exceptions, etc.). In one embodiment, the VM kernel 50 may comprise the GSX product available from VMWare, Inc. (Palo Alto, Calif.), now owned by EMC Corporation. In another embodiment, the VM kernel may comprise the Virtual PC product available from Connectix Corporation (San Mateo, Calif.), now owned by Microsoft Corp. The VM kernel may include a Java Virtual Machine, in some embodiments. In other embodiments, the VM kernel may include virtual machine technologies for the Linux platform such as user mode Linux (UML) virtual machines or plex86. It is noted that the VM kernel may also be referred to as a virtual machine monitor (VMM) such as the VMMs used on mainframe computer systems such as those available from International Business Machines Corporation. In the illustrated embodiment, the VM kernel may execute on the client OS 48. In other embodiments, the VM kernel may execute directly on the underlying hardware (i.e. without an underlying operating system). For example, the ESX product available from VMWare, Inc. may be used.

The login script 52 may comprise software that executes to present a log in interface to a user, to authenticate the user, and to start execution of the user's virtual machine. The login script 52 may be written in a script language (e.g. perl, korn, c shell, etc.), or may comprise compiled software instructions, in various embodiments.

It is noted that the client system 10A may include a computer accessible medium storing the filesystem client software 44, the replication software 46, the client OS 48, the VM kernel 50, and the login script 52 (not shown in FIG. 2).

Figure 3:
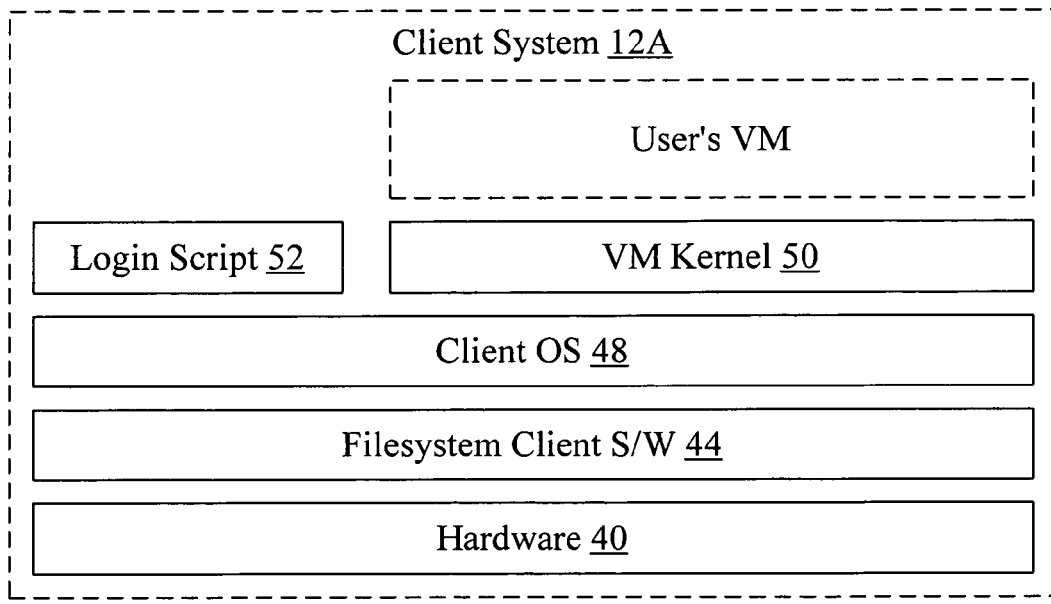
FIG. 3 is a block diagram of one embodiment of a client system that may be continuously coupled to a network in the system of FIG. 1.

Turning now to FIG. 3, a block diagram of one embodiment of the client system 12A in more detail is shown. In the illustrated embodiment, the client system 12A includes the hardware 40, the filesystem client software 44, the client OS 48, the VM kernel 50, and the login script 52.

In some embodiments of the client system 12A, the filesystem client software 44 may implement a caching mode. In the caching mode, recently used and updated file blocks may be cached on the client system, and the cache may be checked for a hit whenever a block is accessed by the client system 12A. The caching may be controlled on a file-by-file basis, in some embodiments (e.g. caching may be enabled for files containing virtual machine data and disabled for other files). For updates, the block may be added to the cache after the update is complete in the storage subsystem 22. Additional details regarding one embodiment of the caching mode are provided below.

It is noted that the client system 12A may include a computer accessible medium storing the filesystem client software 44, the client OS 48, the VM kernel 50, and the login script 52 (not shown in FIG. 3).

Figure 4:
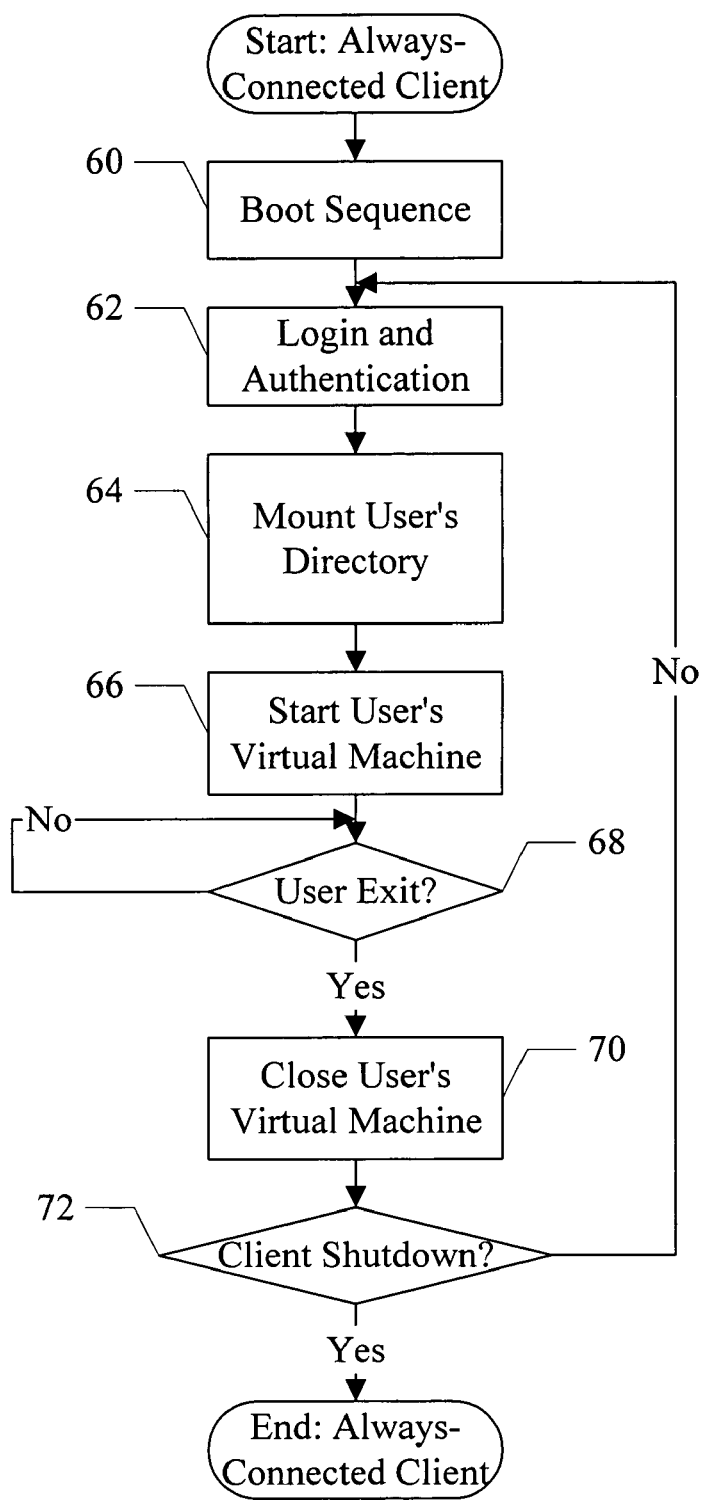
FIG. 4 is a flowchart illustrating one embodiment of operating a client system that may be continuously coupled to the network in the system of FIG. 1.

Turning now to FIG. 4, a flowchart illustrating operation of one embodiment of a client system 12A-12M (an "always-connected client") is shown. Blocks that are implemented in software may represent a plurality of instructions comprising the software which, when executed on the always-connected client, perform the function(s) described for the blocks.

The always-connected client may proceed through a boot sequence when initially powered-on (block 60). Generally, the term "boot" refers to any set of events, hardware and/or software, used to initialize a computer system and load the operating system (e.g. the client OS 48) for execution. In some embodiments, the boot sequence may include communicating with the provisioner server 20 to determine if the always-connected client is to be provisioned. An exemplary embodiment is shown in FIG. 5 and described in more detail below.

Once the always-connected client has booted, the login script 52 may be executed. The login script 52 may present an interface for a user to log in to the always-connected client. A user logs in and is authenticated (block 62). Any mechanism for authenticating a user may be used. For example, the user's password may be checked against a locally-stored password file such as /etc/passwd. Alternatively, Microsoft's Active Directory authentication may be used. In other alternatives, lightweight directory access protocol (LDAP) authentication or Network Information Service (NIS, also known as yellow pages or directory service) authentication may be used.

Figure 6:
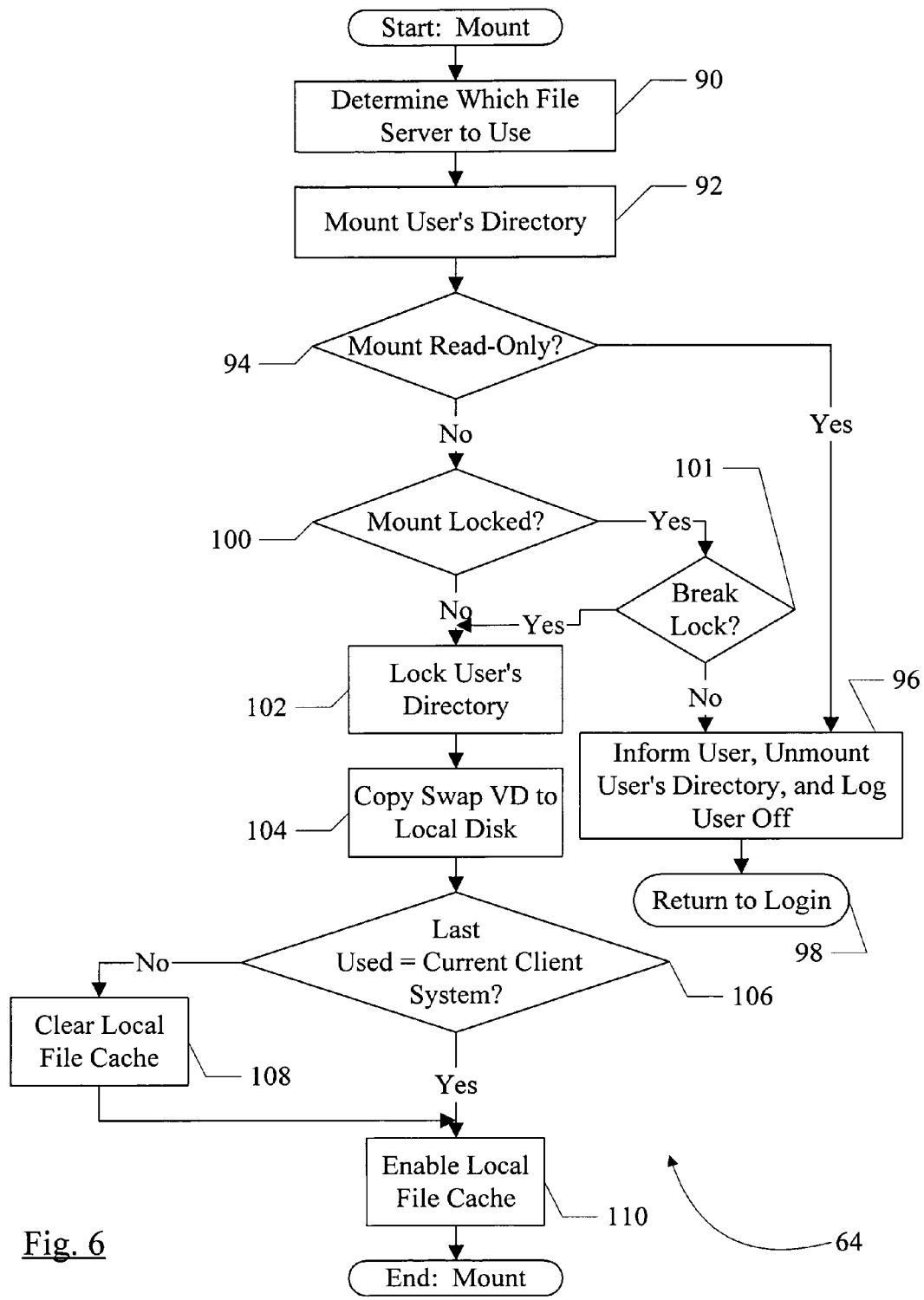
FIG. 6 is a flowchart illustrating one embodiment of a mount block from the flowchart of FIG. 4.
Figure 7:
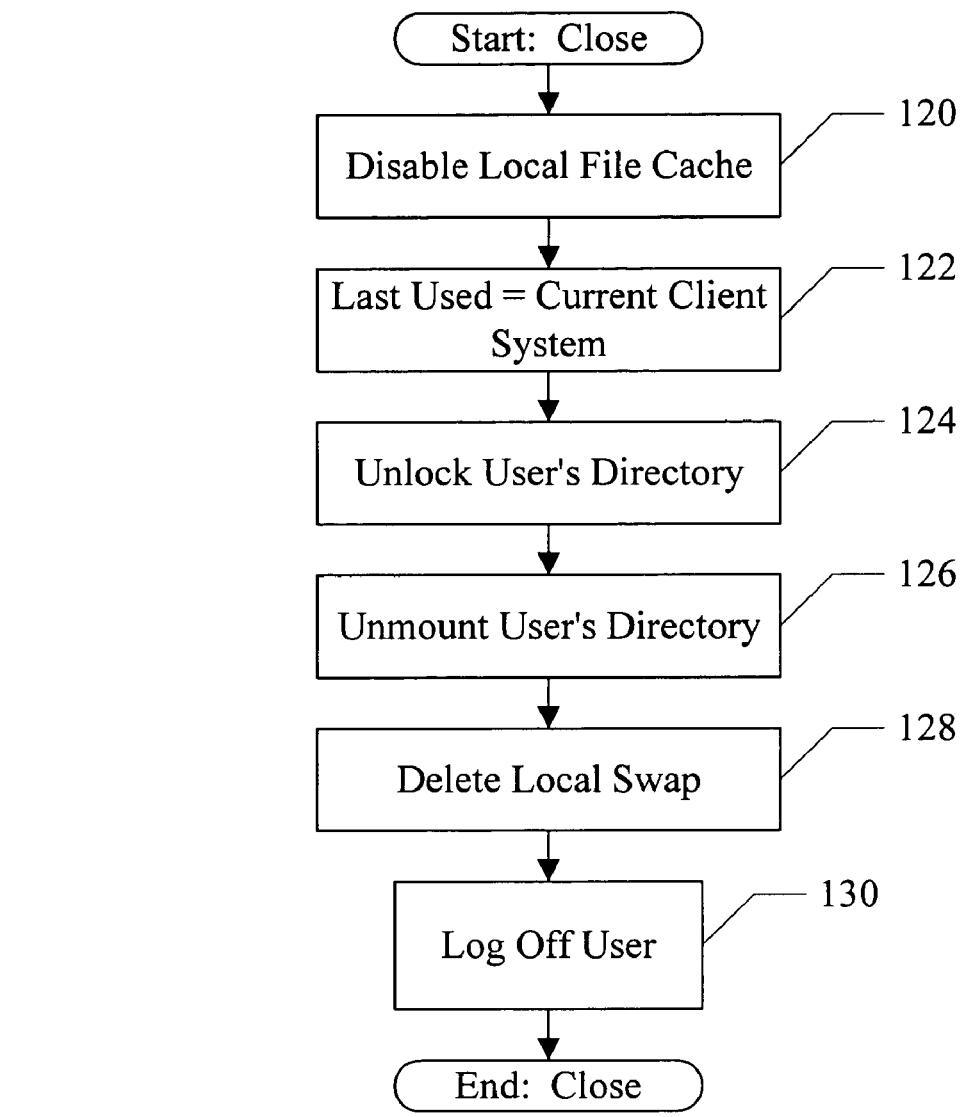
FIG. 7 is a flowchart illustrating one embodiment of a close block from the flowchart of FIG. 4.

Once the user is authenticated, the login script 52 may mount the user's directory or directories from the filesystem provided by the file servers 16A-16Q (block 64). One embodiment of block 64 is shown in FIG. 6 and described in more detail below. If the user's directory is successfully mounted, the login script may start execution of the user's virtual machine (block 66). Execution of the user's virtual machine, accessing and updating the files in the user's directory on the storage subsystem 22, continues until the user exits (decision block 68). Once the user decides to exit, the always-connected client closes the user's virtual machine (block 70). One embodiment of block 70 is shown in FIG. 7 and described in more detail below. If the always-connected client is being shutdown (decision block 72, "yes" leg), the flowchart exits. If the always-connected client is not being shutdown (decision block 72, "no" leg), the login script 52 may be executed again to present the login interface to the next user.

Figure 5:
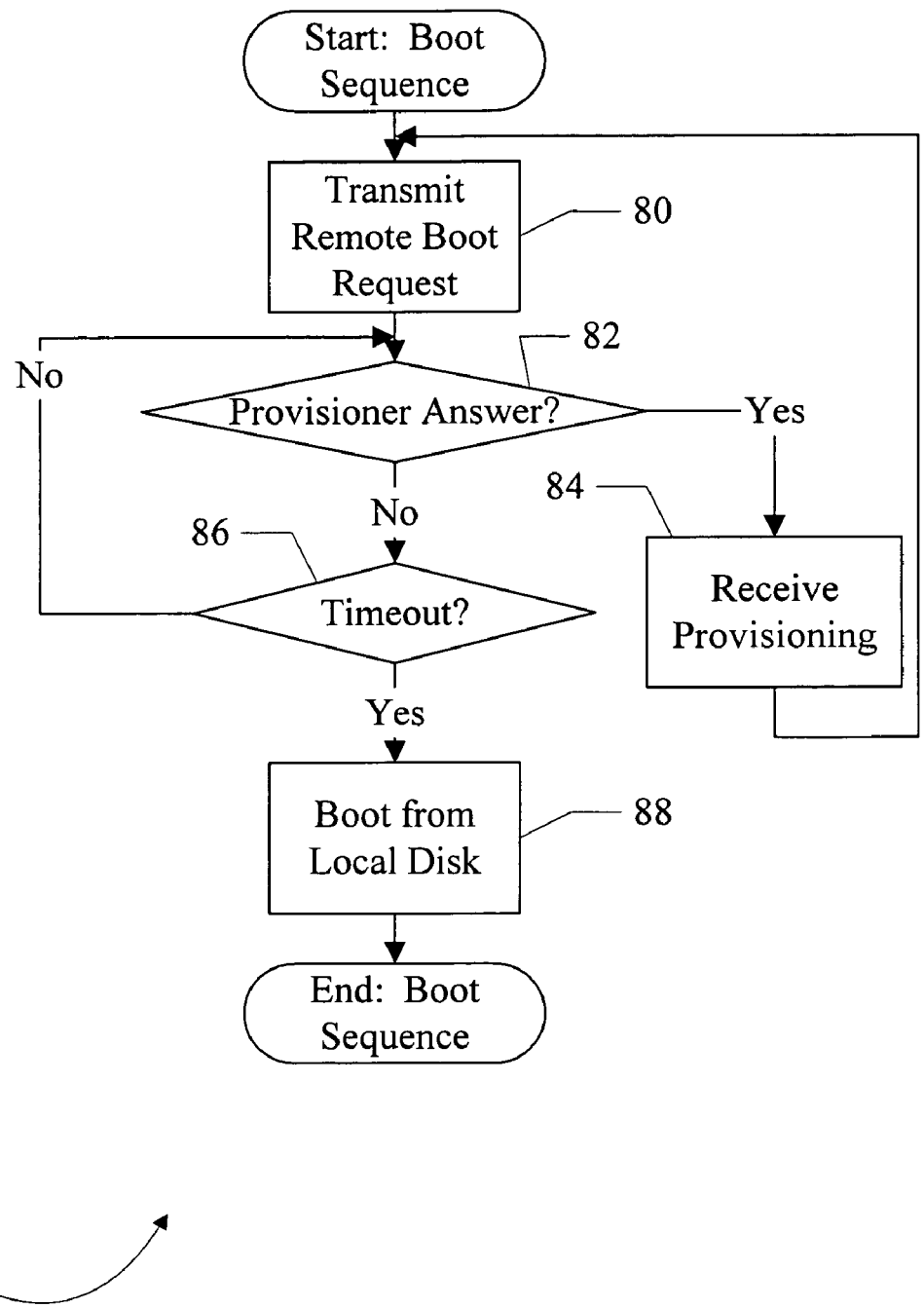
FIG. 5 is a flowchart illustrating one embodiment of a boot sequence block from the flowchart of FIG. 4.

FIG. 5 is a flowchart illustrating one embodiment of the boot sequence (block 60 in FIG. 4) used by one embodiment of an always-connected client. Blocks that are implemented in software may represent a plurality of instructions comprising the software which, when executed on the always-connected client, perform the function(s) described for the blocks. For example, the blocks in FIG. 5 may be implemented in firmware on the always-connected client, such a basic input/output system (BIOS) code.

In the embodiment of FIG. 5, the boot sequence may include transmitting a remote boot request (block 80). For example, personal computer (PC) computer systems may implement a Pre Execution Environment (PXE) boot request. A PXE boot request may comprise a specially formatted packet transmitted on the network 24 that identifies the booting computer system (e.g. by the media access controller (MAC) address in the network interface controller in the booting computer system) and indicates that a boot is occurring. The booting computer system may check for a response on the network, and may timeout after a specified interval if no response is received. If a timeout occurs, boot may continue with other bootable devices (e.g. fixed or removable disk drives in the booting computer system or coupled thereto). In other embodiments, other types of remote boot protocols may be used. For example, computer systems available from Sun Microsystems, Inc. (Santa Clara, Calif.) may support a net boot protocol. As used herein, a "remote boot request" may comprise any communication from a booting computer system, transmitted external to the computer system in order to receive boot code from a remote system or device. A response to the remote boot request may include the boot code, or may indicate where the boot code may be located (within the booting computer system or external to the booting computer system).

In the present embodiment, the provisioner server 20 may respond to the remote boot request if the booting always-connected client is to be provisioned. For example, the provisioner server 20 may record an indication for each computer system that is to be provisioned. In one particular embodiment, the provisioner server 20 may maintain a database of the computer systems in the system of FIG. 1, and other systems (e.g. admin systems 14A-14P) may update the database to indicate which computer systems are to be provisioned. If the provisioner server 20 responds to the remote boot request (decision block 82, "yes" leg), the always-connected client receives the provisioned resources from the provisioner server 20 (block 84), installs the provisioned resources, and reboots (returning to block 80). In one implementation, the provisioned resources may comprise the resources shown in FIG. 3.

If the provisioner server 20 does not answer the remote boot request (decision block 82, "no" leg), the always-connected client may determine if the timeout for the remote boot request has expired (decision block 86). If the timeout has not expired (decision block 86, "no" leg), the always-connected client may continue to await a response from the provisioner. If the timeout has expired (decision block 86, "yes" leg), the always-connected client may boot from the local disk (block 88).

FIG. 6 is a flowchart illustrating one embodiment of mounting the user's directory (block 64 in FIG. 4) that may be used by one embodiment of an always-connected client. Blocks that are implemented in software may represent a plurality of instructions comprising the software which, when executed on the always-connected client, perform the function(s) described for the blocks. For example, the blocks in FIG. 6 may be implemented in the login script 52.

The login script 52 may determine which file server 16A-16Q to use to mount the users directory (block 90). Any mechanism may be used. For example, a local configuration script may be executed, NIS may be used, LDAP may be used, Active Directory may be used, or a lookup in a central database may be used. The login script 52 may mount the user's directory (block 92). The login script 52 may check the mount to ensure that the virtual machine may be executed from the mount. For example, the login script 52 may check if the mount is read-only. If the mount is read-only, then updates may not be propagated to the storage subsystem 22. Accordingly, if the mount is read-only (decision block 94, "yes" leg), the login script 52 may inform the user, unmount the user's directory, and log the user off (block 96). The login script 52 may then return to the login block 62 in FIG. 4 (block 98). Another check may determine if the mount is locked (decision block 100). For example, a lock file may be used in the present embodiment. If a lock file exists in the user's directory, then another system may have the user's directory mounted (e.g. if the user has not logged off the other system, or if there is a problem with the other system or the user's virtual machine that has prevented log off on the other system). Other embodiments may use other locking schemes. If the mount is locked (decision block 100, "yes" leg), the login script 52 may optionally identify which computer system 10A-10A or 12A-12M has the lock and may give the user the option to "break" the lock and continue operation (decision block 101). Other embodiments may not provide the option to break the lock. Permitting the user to break the lock may be used to recover from an error or other problem on another computer system that the user was previously using, although a loss of data may occur. If the user does not choose to break the lock (decision block 101, "no" leg) (or if the option to break the lock is not supported), the login script 52 may inform the user, unmount the user's directory, and log the user off (block 96). The login script 52 may then return to the login block 62 in FIG. 4 (block 98). If the user chooses to break the lock (decision block 101, "yes" leg), operation may continue at block 102. In some cases, breaking the lock may also include other cleanup, e.g. changing the identity of the last always-connected client, before continuing operation.

If the mount is not locked, the login script 52 may lock the user's directory atomically (block 102). For example, if a lock file is used, the login script 52 may create the lock file in the user's directory. In some embodiments, the contents of the lock file may be the identity of the always-connected client that locked the directory. In such embodiments, an administrator may be able to determine which always-connected client is executing a user's virtual machine.

In some embodiments, a virtual disk may be dedicated for swapping or paging of virtual memory by the user's OS. As used herein, the term "swap" refers to the OS's movement of virtual memory information between memory and external storage, and may refer to the external storage that contains the virtual memory information in some cases. For example, if the user's OS is Windows, the swap file may be allocated to the dedicated virtual disk. For various Unix implementations, the swap partition may be allocated to the dedicated virtual disk. Dedicating a virtual disk to swapping may permit the swap data to be stored only locally on the always-connected client. The dedicated virtual disk on the storage subsystem 22 may comprise configuration information describing the virtual disk. For example, the configuration information may include its size, and indication that it is the dedicated swap virtual disk, etc. The dedicated virtual disk may be copied to the local storage in the always-connected client, and updates to the dedicated virtual disk on the local storage may not be propagated to the storage subsystem 22. Thus, paging may not create traffic to the filesystem 30 and the storage subsystem 22. The swap data is not required after the virtual machine is closed, and so reflecting swap updates to the storage subsystem 22 may not be required. In such embodiments, the login script 52 may copy the dedicated swap virtual disk to the local disk (block 104).

In some embodiments, the last always-connected client to execute the user's virtual machine may be recorded. For example, a last-used file may be created in the user's directory, and the contents of the file may identify the last always-connected client to execute the virtual machine. The login script may check the last-used file to determine if the current always-connected client was the last to execute the virtual machine. If not (decision block 106, "no" leg), the local cache of the always-connected client may be cleared (block 108). If so (decision block 106, "yes" leg), the local cache of the always-connected client may contain cache data that may be used by the executing virtual machine. Thus, the local cache may not be cleared. In either case, if caching mode is implemented, the local cache may be enabled (block 110).

Turning next to FIG. 7, a flowchart illustrating one embodiment of closing the user's virtual machine (block 70 in FIG. 4) that may be used by one embodiment of an always-connected client is shown. Blocks that are implemented in software may represent a plurality of instructions comprising the software which, when executed on the always-connected client, perform the function(s) described for the blocks.

The always-connected client may disable the local file cache (block 120). Additionally, the always-connected client may record itself as the last always-connected client to execute the user's virtual machine (block 122) and may unlock the user's directory (block 124). For example, in embodiments that use the lock file and the last-used file, the always-connected client may rename the lock file as the last-used file (thereby unlocking the user's directory and recording itself as the last-used client). The always-connected client may unmount the user's directory (block 126). The always-connected client may delete the local swap file/partition (block 128) to maintain security, since some of the user's information may be in the local swap file/partition. The always-connected client may log off the user (block 130).

While some embodiments described above use a lock file to implement locking, other embodiments may implement locking in other fashions. For example, a database may be maintained of directories and whether or not they are locked. Alternatively, a central locking resource may be implemented, and client systems may communicate with the central locking resource to acquire and release locks. As another example, the file servers 16A-16Q may implement the locking. Similarly, while a last-used file is used in some embodiments above to record the last client system to execute a virtual machine, other embodiments may use other methods (including methods similar to the above-mentioned examples of locking). Locking and/or recording the last client system to execute a virtual machine may be optional, and may not be implemented in other embodiments.

Figure 8:
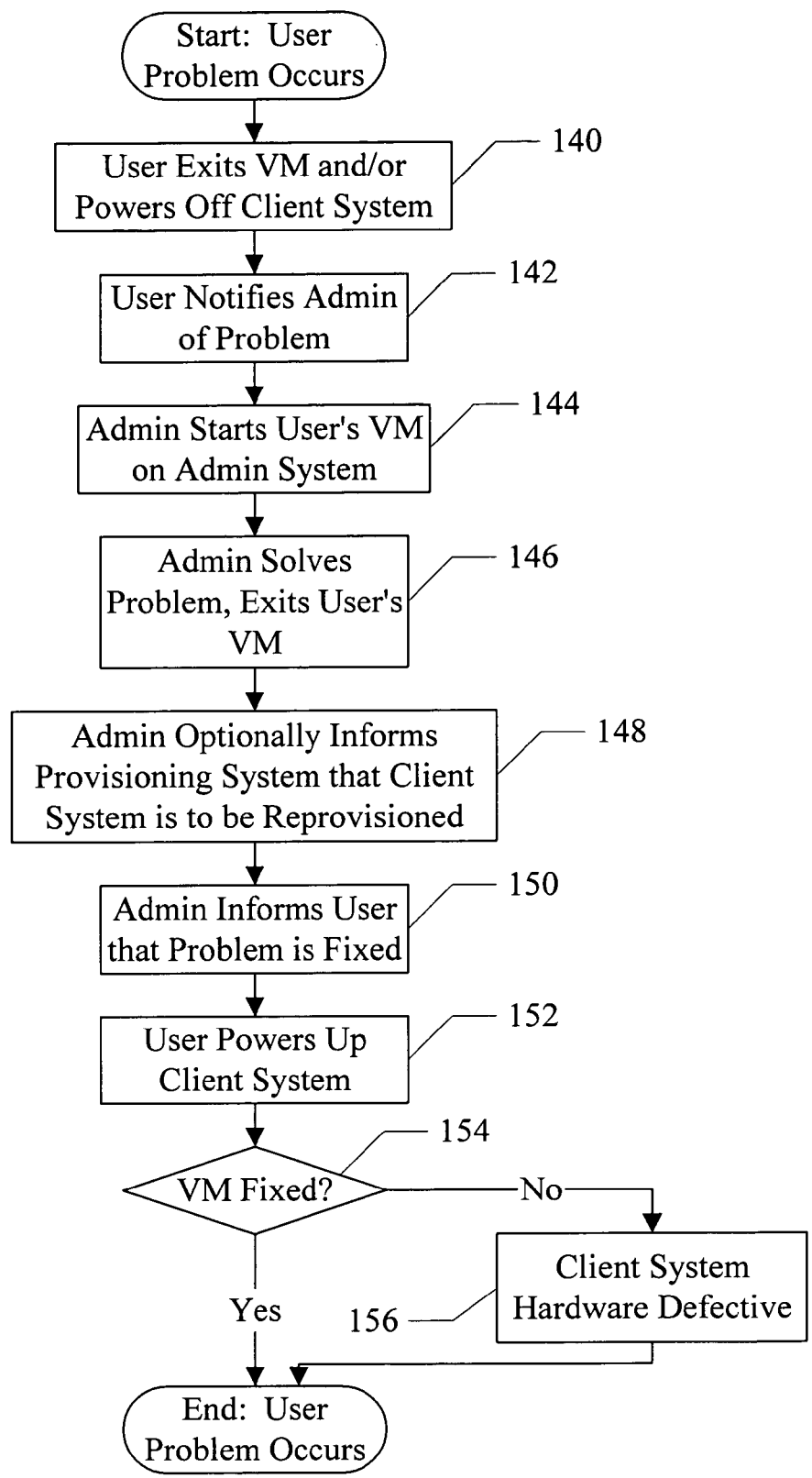
FIG. 8 is a flowchart illustrating one embodiment of a method for diagnosing/correcting a user problem.

Turning next to FIG. 8, a flowchart illustrating one embodiment of a method for diagnosing and correcting a user problem is shown. Blocks that are implemented in software may represent a plurality of instructions comprising the software which, when executed, perform the function(s) described for the blocks.

Generally, a user problem may encompass any problem which prevents a user from executing his/her virtual machine, prevents him/her from successfully using applications installed in the virtual machine, or impacts the performance of the virtual machine. The problem may be in the user's software (within the virtual machine), the software on the client that the user logged into, the client hardware, or a combination thereof.

The user may exit the virtual machine and/or power off the client system (block 140). If the user is able to exit the virtual machine properly (e.g. the virtual machine and/or client system is in operable enough state to exit), the user need not power off the client system unless instructed to do so by the administrator. On the other hand, if the user is not able to exit the virtual machine, the user may power of the client system. The user may notify the administrator of the problem (block 142).

The administrator, on one of the admin systems 14A-14P, starts the user's virtual machine (block 144). In some embodiments, the administrator may need to take steps to force the user's virtual machine to start (e.g. clearing locks that were not cleared due to a failed exit of the virtual machine, etc.). The administrator diagnoses any problems that may exist in the user's virtual machine and corrects the problems (block 146). The administrator exits the user's virtual machine, and thus the corrected virtual machine is stored on the storage subsystem 22.

Optionally, if the problem may involve software installed on the client system, the administrator may inform the provisioner server 20 that the client system is to be reprovisioned (block 148). For example, if the provisioner server 20 maintains a database of all the computer systems in the system of FIG. 1, the administrator may update the database to indicate that the client system is to be reprovisioned. In another example, the administrator may reprovision the client system as a default, to assure that any contributing factors on the client system are eliminated. The administrator then informs the user that the problem is fixed (block 150). If the system is to be reprovisioned, the administrator may request that the user reboot the client system. The user powers up the client system (block 152) and attempts to log in and start the virtual machine. If the virtual machine starts properly (decision block 154, "yes" leg), the problem may be viewed as fixed. If the virtual machine does not start properly (decision block 154, "no" leg), the client system hardware may be defective (block 156). The hardware may be called in for repair, or simply replaced.

Figure 9:
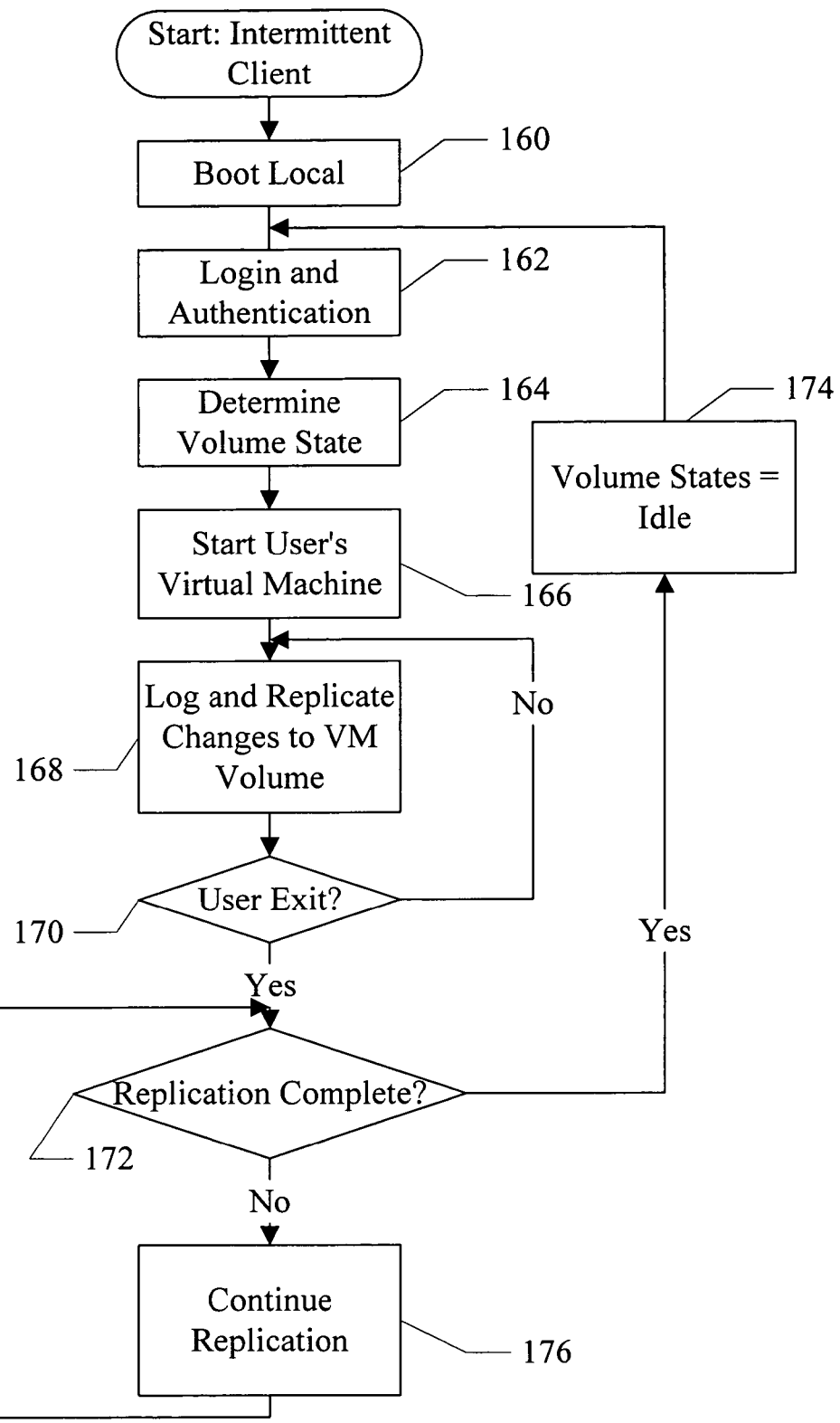
FIG. 9 is a flowchart illustrating one embodiment of operating a client system that may be intermittently coupled to the network in the system of FIG. 1.

Turning now to FIG. 9, a flowchart illustrating operation of one embodiment of a client system 10A-10N (an "intermittent client") is shown. Blocks that are implemented in software may represent a plurality of instructions comprising the software which, when executed on the intermittent client, perform the function(s) described for the blocks. The embodiment illustrated in FIG. 9 describes volume replication for replicating changes to the user' virtual machine data. Other embodiments may employ file replication.

The intermittent client may boot locally (block 160). That is, the intermittent client may not issue a remote boot request as part of its boot sequence. Since the intermittent client may not always be connected to the network, the remote boot request may frequently timeout, delaying the boot unnecessarily. Alternatively, the user may be given the option to transmit a remote boot request, and the intermittent client may boot locally or may use a boot sequence similar to that shown in FIG. 5 based on the user's response.

The login script 52 on the intermittent client may execute and present a login interface for the user. The user may login and be authenticated (block 162). Any authentication method may be used, although the method may default to a local method if no network connection is available. If a network connection is available, the network connection may be established (including any user input that may be required to establish the network connection).

The login script 52, in concert with the replication software 46, may determine the volume state (block 164). As part of determining the volume state, and dependent on whether or not a network connection is available, login script 52/replication software 46 may prompt the user to determine whether or not to continue. A more detailed discussion of one embodiment of determining the volume state is provided below with respect to FIG. 10. Assuming that the determination of the volume state permits continued execution (see, e.g., FIG. 10), the login script 52 may start the user's virtual machine (block 166). The virtual machine may be started from the virtual machine data on the intermittent client (e.g. the data in the replicated volume(s), in the volume replication embodiments). It is noted that, while the present embodiment is described with respect to volume replication, other embodiments may implement file replication. A similar determination of the state of the files may be performed in such embodiments.

The replication software 46 may generally log changes to the replicated volume(s) (that is, to the virtual machine data) (block 168) as the virtual machine continues executing on the intermittent client. Additionally, if a network connection is available, the replication software 46 may replicate the changes to the storage subsystem 22. The process of logging changes and replicating changes may continue as the virtual machine execution continues (decision block 170, "no" leg). If the user exits the virtual machine (decision block 170, "yes" leg), replication may continue until the volume replication completes. That is, replication may continue until the virtual machine data in the storage subsystem 22 is up to date with the virtual machine data on the intermittent system. If the volume replication is complete (decision block 172, "yes" leg), the replication software 46 may change the volume states on the intermittent system and the storage subsystem 22 to idle (block 174). The intermittent system may wait for the next user login (block 162). If the volume replication is not complete (decision block 172, "no" leg), the replication software 46 may continue replication (block 176). At any time while replication continues after the user exits the virtual machine, a user may log in to the intermittent system. Replication may continue in the background after the user logs in.

Figure 10:
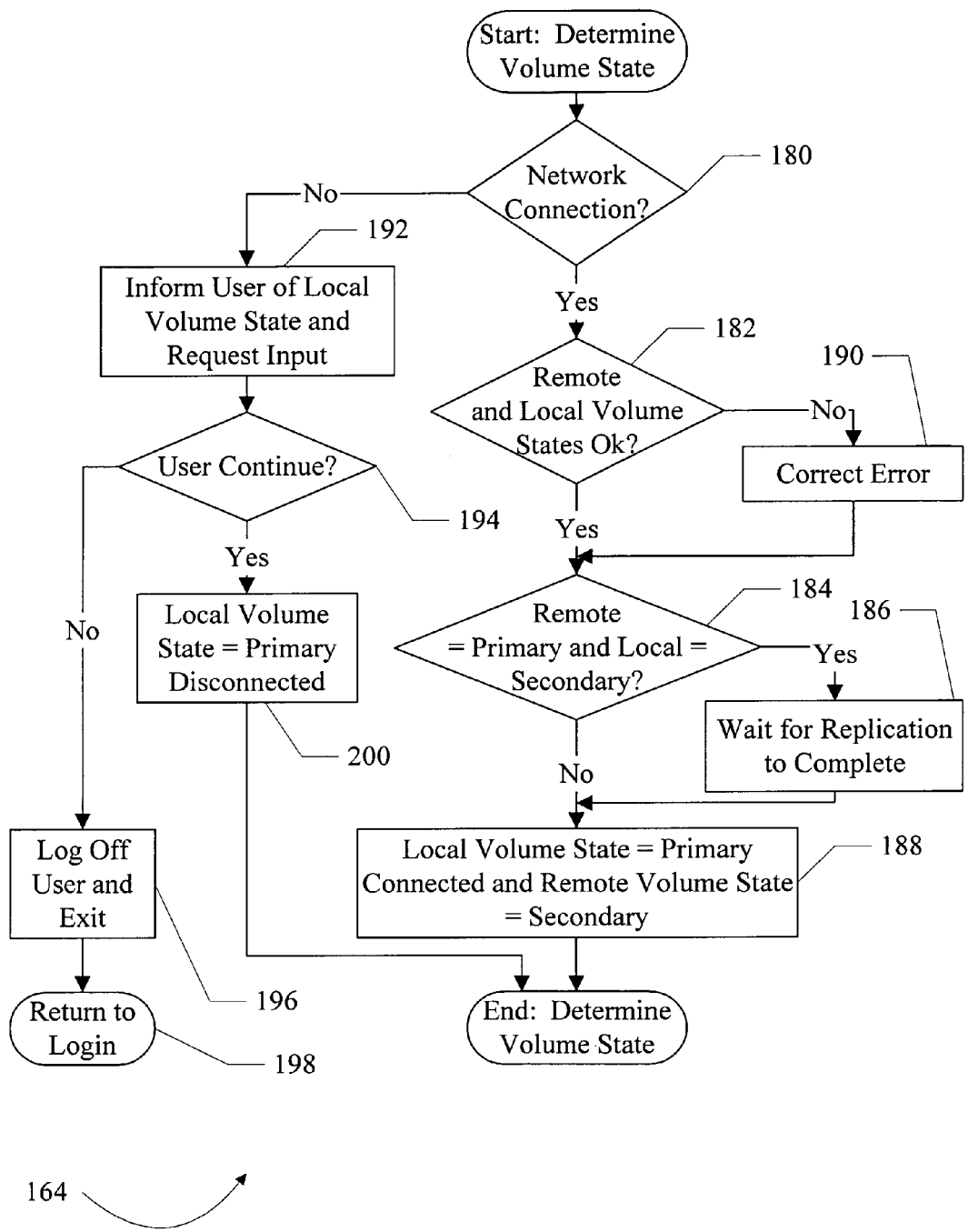
FIG. 10 is a flowchart illustrating one embodiment of a determine volume state block from the flowchart of FIG. 9.

Turning now to FIG. 10, a flowchart is shown illustrating one embodiment of determining the volume state (block 164). Blocks that are implemented in software may represent a plurality of instructions comprising the software which, when executed on the intermittent client, perform the function(s) described for the blocks. Volume state may be determine relative to the volume replication. There may be at least four states for a replicated volume: primary connected, primary disconnected, secondary, and idle. The primary connected state or the primary disconnected state are states of the replicated volume that is actively updated by the user. For example, during normal operation, the volume on the intermittent system may be in either the primary connected state or the primary disconnected state. The primary connected state is used if a network connection to a secondary volume exists, and the primary disconnected state is used if such a network connection does not exist. A secondary state applies to a volume receiving replication from the primary volume. For example, during normal operation, the volume on the storage subsystem 22 is the secondary volume. The idle state applies to a volume in which replication is not currently underway.

The replication software 46 may determine if a network connection exists (decision block 180). If a network connection exists (decision block 180, "yes" leg), the replication software 46 may determine the remote and local volume states and determine if the states are appropriate for starting operation (decision block 182). The local volume state may be the state of the volume on the intermittent client. The remote volume state may be the state of the volume on the storage subsystem 22. FIG. 11 is a table illustrating possible volume states and the result for one embodiment of volume replication. FIG. 11 is described in more detail below.

If the remote and local volume states are appropriate for starting operation (decision block 182, "yes" leg), the replication software 46 may generally begin operation. However, if the remote volume state is primary and the local volume state is secondary (decision block 184, "yes" leg), the replication software 46 is in the process of replicating from the storage subsystem 22 to the intermittent client. The replication software 46 may wait for the replication to complete (block 186). In either case, the replication software 46 may change the local volume state to primary connected, the remote volume state to secondary of the intermittent client (block 188).

On the other hand, if the remote and local volume states are not appropriate for starting operation, such as the error cases in FIG. 11, the replication software 46 may wait for the error to be corrected before continuing (decision block 182, "no" leg and block 190). In some embodiments, the error may be corrected manually, such as by an administrator. In some cases, the definition of the virtual disks in the user's virtual machine may simplify correction of the error.

If a network connection is not available (decision block 180, "no" leg), the remote volume state may not be determined. The replication software 46 may inform the user of the local volume state and request input (block 192). The replication software 46 may also indicate the age of the local volume state. If the user elects not to continue (decision block 194, "no" leg), the login script 52 may log the user off (block 196). Execution may return to block 162 to await user login (block 198). If the user elects to continue (decision block 194, "yes" leg), the replication software 46 may change the state to primary disconnected (block 200).

The user may consider a variety of factors in deciding whether or not to continue if the network connection is not available. If the local volume state is primary and the state is recent, the user may conclude that the likelihood of more recent updates on the storage subsystem 22 is low and the user may elect to continue. If the local volume state is secondary and is recent, the user may conclude that replication from the storage subsystem 22 to the intermittent client was in progress recently and not completed, and thus the user may choose not to continue. In other embodiments, the login script 52/replication software 46 may default whether or not to start the virtual machine using the above rules or other rules, and may not request input from the user.

It is noted that, in embodiments in which a client system 10A-10N has a network connection but it is not fast enough to provide acceptable performance as an always-connected client, a network connection is available and blocks 180, 192, 194, 196, 198, and 200 may be eliminated from the flowchart of FIG. 10.

Turning next to FIG. 11, a table of volume states and actions for one embodiment of the replication software 46 is shown.

The first row of the table in FIG. 11 illustrates the volume states for normal operation when the intermittent system is connected to the network 24. The local volume state is primary connected, and the remote volume state is secondary to the intermittent client system. In this case, the volume replication software 46 may continue replication from the primary volume to the secondary volume.

The second row of the table illustrates a first error case for the volume states, in which the primary volume state is primary connected and the remote volume state is not secondary of the intermittent client system. This error case (denoted Error1 in the table) may occur if the remote volume is forced out of the secondary state. For example, the remote volume may be forced out of the secondary state if an administrator makes a correction to the user's virtual machine data to fix a problem. Alternatively, a maintenance action may force the remote volume out of secondary state (e.g. a software update, a virus removal, etc.).

The third row of the table is another normal case in which the local volume state is primary disconnected and the secondary volume state is idle. In this case, the replication software 46 may change the remote volume state to secondary of the intermittent client system, the local volume state to primary connected, and begin replication.

The fourth row of the table is a second error case (labeled Error2 in the table) in which the local volume state is primary disconnected and the remote volume state is not idle. This error case may occur, for example, if the virtual machine is started on the intermittent client when the intermittent client is not connected to the network.

The fifth row of the table is the case of replicating from the storage subsystem 22 to the intermittent client. In this case, the local volume state is secondary and the remote volume state is primary of the intermittent client system. This case may occur, for example, if a change to the virtual machine data is made on the storage subsystem 22 and the volume states are set to replicate the update to the intermittent client (either manually or automatically as part of an update process in which the user exits the virtual machine, the replication to the storage subsystem 22 is completed, and then the update is subsequently performed on the storage subsystem 22). This case may also be forced by an administrator after correcting a problem with the user's virtual machine, to cause the corrected virtual machine to be copied to the intermittent client.

The sixth row of the table is a third error case (labeled Error3 in the table). In this case, the local volume state is secondary and the remote volume state is not primary of the intermittent client. This case may occur, for example, if the intermittent client is absent from the network 24 for an extended period and the states are reset.

The seventh row of the table is the case in which both volume states are idle. This is the case after replication is completed, for example.

In one embodiment, the error cases may be corrected in one of three ways: (1) the virtual machine data on the intermittent client may override the virtual machine data on the storage subsystem 22; (2) the virtual machine data on the storage subsystem 22 may override the virtual machine data on the intermittent client; or (3) a new virtual machine may be created and virtual machine data from either system may be used as desired. In some cases, the definition of the virtual machine may make simplify the decision.

Figure 12:
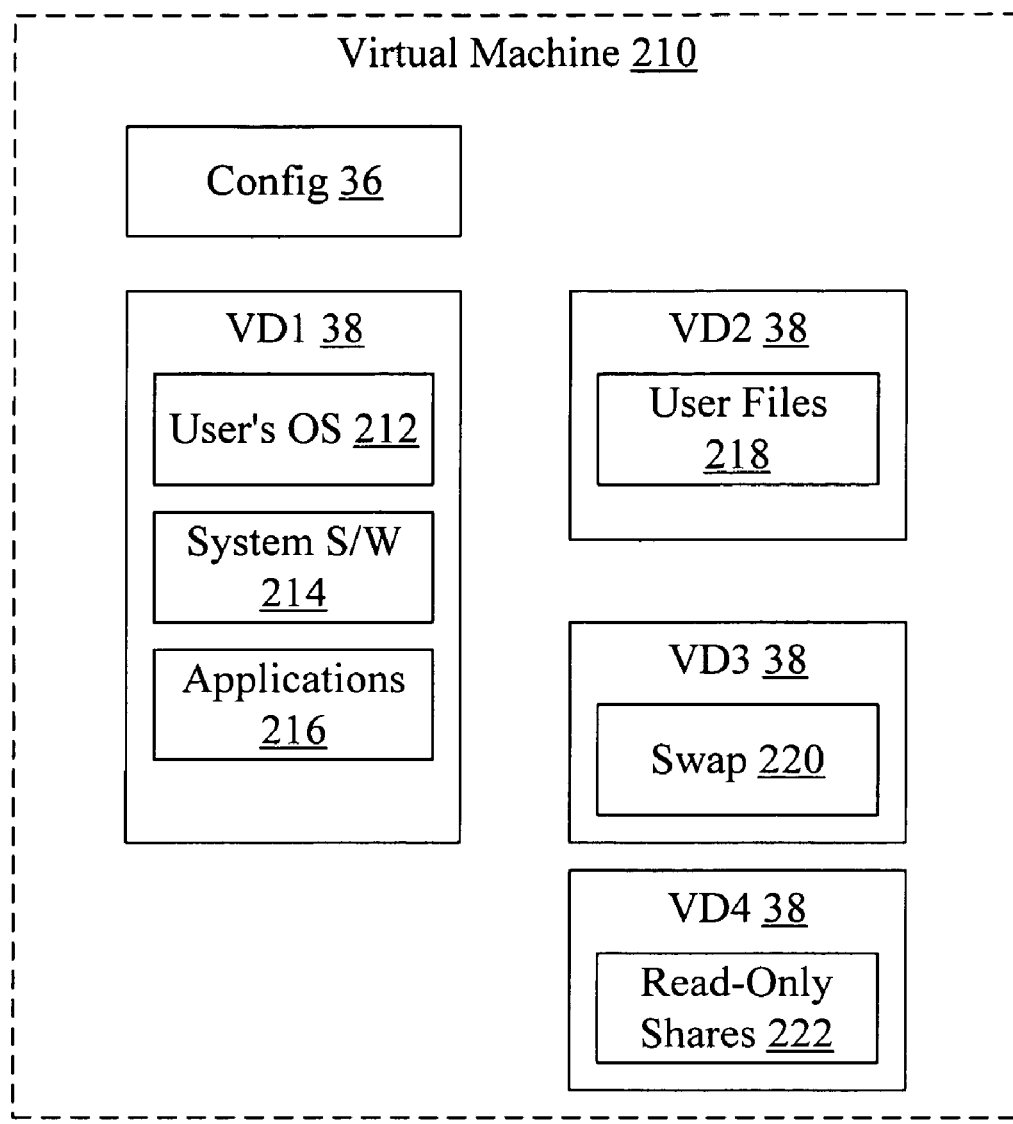
FIG. 12 is a block diagram illustrating one embodiment of a virtual machine configuration.

For example, FIG. 12 is an exemplary virtual machine 210 including a configuration file 36 and four virtual disks 38 (labeled VD1 through VD4). VD1 may comprise the user's software, including the user's OS 212, other system software 214, and applications 216. VD2 may comprise user files 218 (e.g. files creates using the user's applications). VD3 may comprise the swap file or swap partition 220, as described above. VD4 may comprise read-only shared data 222 that may be shared among multiple users.

Separating user data on VD2 (typically modified when the virtual machine is executing on the intermittent client) from software on VD1 (typically modified by the maintenance server or an administrator on the storage subsystem 22) may simplify the decision of how to correct the error cases. For example, the storage subsystem 22 may override the intermittent client for VD1 and the intermittent client may override the storage system 22 for VD2. For volume replication, VD1 and VD2 may be on separate volumes. Alternatively, file replication may be used and the VD1 file from the storage subsystem 22 and the VD2 file from the intermittent client may be selected.

Providing a virtual disk for read-only shared data (VD4) may provide a convenient mechanism for sharing data among multiple users. For example, in some embodiments, the VD4 file may be a symbolic link included in any virtual machine for which shared access to the files on the VD4 virtual disk is desired. Only one copy of the files may be provided in such an embodiment. In other embodiments, the files may be included directly in the VD4 virtual disk in each virtual machine. In still other embodiments, a virtual disk or disks may provide shared access to data and write access may also be permitted. For example, each virtual machine may make a copy of the shared data and may make the copy read/write. Alternatively, each virtual machine may create one or more copy-on-write (COW) files to store changes made to the shared virtual disk(s) in that virtual machine. The COW files may be part of each individual virtual machine. While updates to the shared data may not be consistent across various virtual machines, such consistency may not be desired in some circumstances. For example, the shared data may comprise a common software installation used in multiple virtual machines, and the COW file(s) in each virtual machine may contain user customizations of the common installation.

Figure 13:
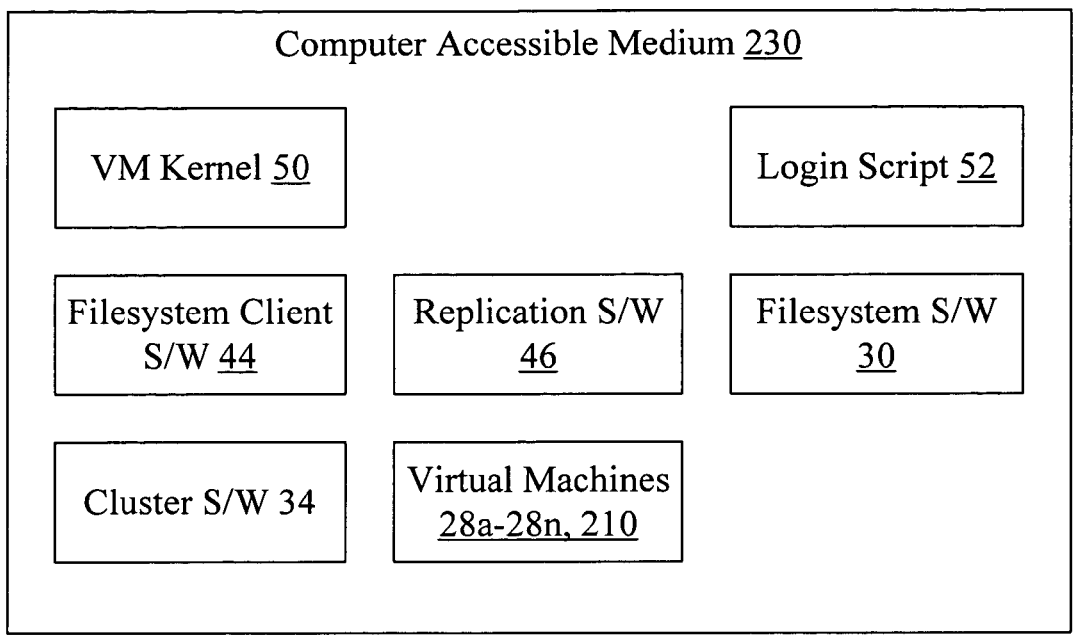
FIG. 13 is a block diagram illustrating one embodiment of a computer accessible medium.

Turning now to FIG. 13, a block diagram of a computer accessible medium 230 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 230 in FIG. 13 may be encoded with one or more of the VM kernel 50, the login script 52, the filesystem client software 44, the replication software 46, the filesystem software 30, the cluster software 34, and/or the virtual machines 28a-28n and 210. Each of the VM kernel 50, the login script 52, the filesystem client software 44, the replication software 46, the filesystem software 30, and the cluster software 34 may comprise instructions which, when executed, implement the functionality described herein for the software. Generally, the computer accessible medium 230 may store any set of instructions which, when executed, implement a portion or all of the flowcharts shown in one or more of FIGS. 4-10. In some embodiments, a computer accessible medium similar to the computer accessible medium 230 may be included in a client system 10A-10N (e.g. the embodiment of FIG. 2), a client system 12A-12M (e.g. the embodiment of FIG. 3), and/or a file server 16A-16Q.

Numerous variations and modifications will become apparent to those skilled in the art once the above disclosure is fully appreciated. It is intended that the following claims be interpreted to embrace all such variations and modifications.

What is claimed is:

1. A system comprising:
   at least one computer system, wherein the computer system is configured to execute a virtual machine corresponding to a user, wherein the virtual machine comprises an operating system and at least one application executable on the operating system, and the operating system and application executing on the computer system during use;

a storage subsystem configured to store data representing the virtual machine, the data including the operating system and the application; and at least one file server coupled to a network to which the computer system is configured to be coupled, wherein the file server is further coupled to the storage subsystem, and wherein the file server is configured to provide the computer system with access to the data representing the virtual machine on the storage subsystem over the network, wherein the data on the storage system includes the operating system and the application, and wherein the computer system is configured to read the data representing the virtual machine from the storage subsystem through the file server for execution of the virtual machine on the computer system, the data read from the storage system including the operating system and the application.

2. The system as recited in claim 1 wherein the at least one file server comprises a plurality of file servers in a cluster, and wherein a failover from a first file server in the cluster to a second file system in the cluster is transparent to the user of the computer system.

3. The system as recited in claim 1 wherein the computer system is configured for essentially continuous connection to the network during use, and wherein the computer system is configured to effect modifications to a state of the virtual machine by modifying the data in the storage subsystem.

4. The system as recited in claim 3 wherein the computer system is configured to cache at least a portion of the data in the computer system.

5. The system as recited in claim 1 wherein the computer system is configured for intermittent connection to the network during use, and wherein the computer system includes storage configured to store the data representing the virtual machine, and wherein the computer system is configured to replicate modifications to a state of the virtual machine to the data stored on the storage subsystem during times that the computer system is connected to the network.

6. The system as recited in claim 1 wherein the at least one computer system comprises a plurality of computer systems, and wherein a given computer system of the plurality of computer systems is configured to execute the virtual machine responsive to a user login to the given computer system.

7. The system as recited in claim 1 further comprising a provisioner server coupled to the network, wherein the computer system is configured, during boot, to issue a remote boot request, and wherein the provisioner server is configured to respond to the remote boot request if the computer system is to be provisioned.

8. The system as recited in claim 1 wherein the storage subsystem is configured to store data representing a plurality of virtual machines, each of the plurality of virtual machines corresponding to a respective user of a plurality of users, and wherein the system further comprises a maintenance server coupled to the storage subsystem, wherein the maintenance server is configured to perform one or more maintenance actions on the plurality of virtual machines on the storage subsystem.

9. The system as recited in claim 1 further comprising a second computer system used by an administrator, wherein the virtual machine is executed on the second computer system by an administrator to diagnose a problem reported by the user, and wherein the administrator is configured to update the virtual machine to correct the problem, and wherein the user is configured to execute the corrected virtual machine from the storage subsystem.

10. A computer accessible storage medium storing a plurality of instructions which, when executed on a computer system, responsive to a login of a user on the computer system, cause the computer system to execute a virtual machine corresponding to the user, the virtual machine represented by data stored in a filesystem accessible to the computer system over a network to which the computer system is configured to be coupled at least intermittently, wherein the virtual machine comprises an operating system and at least one application executable on the operating system, and the operating system and application executing on the computer system during use, and wherein the data stored in the filesystem that represents the virtual machine includes the operating system and the application, and wherein the plurality of instructions, when executed on the computer system, cause the computer system to read the data representing the virtual machine from the filesystem through the file server for execution of the virtual machine on the computer system, the data read from the filesystem including the operating system and the application.

11. The computer accessible storage medium as recited in claim 10 wherein the computer system is configured for essentially continuous connection to the network during use, and wherein the plurality of instructions, when executed, effect modifications to a state of the virtual machine by modifying the data in the storage subsystem.

12. The computer accessible storage medium as recited in claim 11 wherein the plurality of instructions, when executed, cache at least a portion of the data in the computer system.

13. The computer accessible storage medium as recited in claim 12 wherein the plurality of instructions, when executed, determine that the virtual machine was most recently executed on the computer system, and wherein the plurality of instructions are configured to use the cached portion of the data from the most recent execution instead of reading the cached portion of the data from the filesystem.

14. The computer accessible storage medium as recited in claim 10 wherein the computer system is configured for intermittent connection to the network during use, and wherein the computer system includes storage configured to store the data representing the virtual machine, and wherein the plurality of instructions, when executed, effect changes to a state of the virtual machine by modifying the data in the storage, and wherein the plurality of instructions, when executed, replicate modifications to a state of the virtual machine to the data stored in the remote filesystem during times that the computer system is connected to the network.

15. The computer accessible storage medium as recited in claim 14 wherein the plurality of instructions, when executed:
determine whether or not a network connection is available to the filesystem in response to the user log in;
request user input responsive to detecting that no network connection is available; and
change a first replication state of a local volume on the storage that stores the data representing the virtual machine to primary disconnected responsive to the user input indicating to continue.

16. The computer accessible storage medium as recited in claim 14 wherein the plurality of instructions, when executed:
determine a first replication state of a local volume on the storage, the local volume storing the data representing the virtual machine;

determine a second replication state of a remote volume on the remote filesystem that stores the data representing the virtual machine; and replicate responsive to the first replication state and the second replication state.

17. The computer accessible storage medium as recited in claim 10 wherein the plurality of instructions further comprises instructions which, when executed in response to a boot of the computer system, transmit a remote boot request over the network, and wherein a response to the remote boot request includes code that causes a provisioning of the computer system when executed on the computer system.

18. The computer accessible storage medium as recited in claim 17 wherein the instructions, when executed in response to a timeout without receiving a response to the remote boot request, boot the computer system locally.

19. The computer accessible storage medium as recited in claim 10 wherein the plurality of instructions, when executed, mount a directory in the filesystem that contains the data representing the virtual machine.

20. The computer accessible storage medium as recited in claim 19 wherein the instructions, when executed in response to the directory being mounted read-only, log the user off of the computer system.

21. The computer accessible storage medium as recited in claim 19 wherein the plurality of instructions, when executed in response to the directory being locked, attempt to break the lock.

22. The computer accessible storage medium as recited in claim 21 wherein the plurality of instructions, when executed in response to the attempt to break the lock being unsuccessful, log the user off of the computer system.

23. The computer accessible storage medium as recited in claim 19 wherein the plurality of instructions, when executed, lock the mounted directory.

24. The computer accessible storage medium as recited in claim 10 wherein the data representing the virtual machine comprises a swap virtual disk used by the operating system for virtual memory swapping, and wherein the plurality of instructions, when executed, copy the swap virtual disk to the computer system, whereby swapping is performed only locally on the computer system.

25. The computer accessible storage medium as recited in claim 24 wherein the plurality of instructions, when executed in response user log off, delete the swap virtual disk from the computer system.

26. A computer system comprising execution hardware and a computer accessible storage medium coupled to the execution hardware, the computer accessible storage medium storing a plurality of instructions which, when executed by the execution hardware, responsive to a login of a user on the computer system, cause the computer system to execute a virtual machine corresponding to the user, the virtual machine represented by data stored in a filesystem accessible to the computer system over a network to which the computer system is configured to be coupled at least intermittently, wherein the virtual machine comprises an operating system and at least one application executable on the operating system, and the operating system and application executing on the computer system during use, and wherein the data stored in the filesystem that represents the virtual machine includes the operating system and the application, and wherein the plurality of instructions, when executed on the computer system, cause the computer system to read the data representing the virtual machine from the filesystem through the file server for execution of the virtual machine on the computer system, the data read from the filesystem including the operating system and the application.

27. The computer system as recited in claim 26 wherein the computer system is configured for essentially continuous connection to the network during use, and wherein the plurality of instructions, when executed, effect modifications to a state of the virtual machine by modifying the data in the storage subsystem.

28. The computer system as recited in claim 27 wherein the plurality of instructions, when executed, cache at least a portion of the data in the computer system.

29. The computer system as recited in claim 26 wherein the computer system is configured for intermittent connection to the network during use, and wherein the computer system comprises storage configured to store the data representing the virtual machine, and wherein the plurality of instructions, when executed, effect changes to a state of the virtual machine by modifying the data in the storage, and wherein the plurality of instructions, when executed, replicate modifications to a state of the virtual machine to the data stored in the remote filesystem during times that the computer system is connected to the network.

30. A method comprising:
responsive to a login of a user on a computer system, executing a virtual machine corresponding to the user on the computer system, wherein the virtual machine comprises an operating system and at least one application executable on the operating system; and
communicating, at least intermittently, with a file server that manages a filesystem on a storage system, wherein the storage system stores data representing the virtual machine, the data including the operating system and the at least one application, the communicating occurring over a network between the file server and the computer system to provide access to the data representing the virtual machine; and
reading the data representing the virtual machine from the storage system through the file server to the computer system for execution of the virtual machine on the computer system, the data read from the storage system including the operating system and the application.

31. The method as recited in claim 30 wherein the at least one file server comprises a plurality of file servers, the method further comprising clustering the plurality of file servers to provide high availability characteristics in the filesystem, and wherein the clustering comprises failing over from a first file server of the plurality of file servers to a second file server of the plurality of file servers transparent to the user.

32. The method as recited in claim 30 wherein the computer system is configured for essentially continuous connection to the network during use, the method further comprising effecting modifications to a state of the virtual machine by modifying the data in the storage subsystem.

33. The method as recited in claim 32 further comprising caching at least a portion of the data in the computer system.

34. The method as recited in claim 30 wherein the computer system is configured for intermittent connection to the network during use, and wherein the computer system includes storage configured to store the data representing the virtual machine, the method further comprising:
effecting changes to a state of the virtual machine by modifying the data in the storage on the computer system; and
replicating the modifications to a state of the virtual machine to the data stored on the storage subsystem during times that the computer system is connected to the network.

35. The method as recited in claim 34 further comprising:
correcting a problem in the virtual machine by modifying the data on the storage subsystem; and
replicating the data from the storage subsystem to the computer system during a time that the computer system is connected to the network.

36. The method as recited in claim 34 wherein a provisioner server is coupled to the network, the method further comprising:
during boot, issuing a remote boot request from the computer system; and
the provisioner server responding to the remote boot request if the computer system is to be provisioned.

37. The method as recited in claim 36 further comprising:
an administrator diagnosing a problem with the virtual machine;
the administrator determining that the computer system is to be provisioned responsive to diagnosing the problem; and
the administrator indicating to the provisioner server that the computer system is to be provisioned responsive to the determining.

38. The method as recited in claim 30 wherein the storage subsystem stores data representing a plurality of virtual machines, each of the plurality of virtual machines corresponding to a respective user of a plurality of users, the method further comprising performing one or more maintenance actions on the plurality of virtual machines on the storage subsystem.

* * * * *